(12) United States Patent
Yin et al.

(10) Patent No.: US 10,716,100 B2
(45) Date of Patent: Jul. 14, 2020

(54) BASE STATIONS, USER EQUIPMENTS, AND RELATED COMMUNICATION METHODS

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Laboratories of America, Inc., Vancouver, WA (US)

(*) Notice: Subject to any disclaimer, the term of this patent is extended or adjusted under 35 U.S.C. 154(b) by 0 days.

(21) Appl. No.: 15/839,798

(22) Filed: Dec. 12, 2017

(65) Prior Publication Data

US 2018/0167933 A1 Jun. 14, 2018

Related U.S. Application Data

(60) Provisional application No. 62/433,677, filed on Dec. 13, 2016.

(51) Int. Cl.
*H04W 72/04* (2009.01)
*H04W 72/12* (2009.01)
(Continued)

(52) U.S. Cl.
CPC ....... *H04W 72/0413* (2013.01); *H04L 5/0051* (2013.01); *H04L 5/0053* (2013.01);
(Continued)

(58) Field of Classification Search
CPC ........... H04W 28/0231; H04W 52/146; H04W 52/346; H04W 72/04; H04W 72/0406; H04W 72/0413; H04W 72/0446; H04W 72/0453; H04W 72/12; H04W 72/1284; H04W 88/02; H04L 1/0026; H04L 1/1861; H04L 5/00; H04L 5/001; H04L 5/0023;
(Continued)

(56) References Cited

U.S. PATENT DOCUMENTS

2012/0113827 A1 5/2012 Yamada et al.
2013/0077514 A1* 3/2013 Dinan .................. H04L 5/0057
370/252
(Continued)

FOREIGN PATENT DOCUMENTS

JP 20160513380 A 5/2016

OTHER PUBLICATIONS

International Search Report of PCT/US17/65928, dated Feb. 20, 2018.
(Continued)

*Primary Examiner* — Xavier S Wong
(74) *Attorney, Agent, or Firm* — ScienBiziP, P.C.

(57) ABSTRACT

A method for reporting uplink control information (UCI) by a user equipment (UE) is disclosed. The method includes storing information on whether a simultaneous physical uplink control channel (PUCCH) and physical uplink shared channel (PUSCH) transmission is supported. The method also includes, when the simultaneous PUCCH and PUSCH transmission is not supported and in case of a channel collision between a PUCCH and a PUSCH, transmitting, by the UE, the UCI using the PUCCH in an overlapping portion between the PUCCH and the PUSCH, and dropping the overlapping portion of the PUSCH.

4 Claims, 24 Drawing Sheets

(51) Int. Cl.
*H04W 28/02* (2009.01)
*H04L 5/00* (2006.01)

(52) U.S. Cl.
CPC ....... *H04L 5/0055* (2013.01); *H04W 28/0231* (2013.01); *H04W 72/1284* (2013.01); *H04L 5/001* (2013.01); *H04L 5/0023* (2013.01); *H04L 5/0035* (2013.01)

(58) Field of Classification Search
CPC ... H04L 5/0035; H04L 5/0051; H04L 5/0053; H04L 5/0055; H04L 5/0091; H04B 7/0626
See application file for complete search history.

(56) References Cited

U.S. PATENT DOCUMENTS

| | | | | |
|---|---|---|---|---|
| 2014/0105141 | A1* | 4/2014 | Noh | H04W 52/04 370/329 |
| 2014/0241319 | A1* | 8/2014 | Lee | H04L 1/0026 370/331 |
| 2014/0293947 | A1* | 10/2014 | Nishikawa | H04W 72/1257 370/329 |
| 2015/0036618 | A1* | 2/2015 | Xu | H04W 72/0413 370/329 |
| 2015/0249980 | A1* | 9/2015 | You | H04L 1/1861 370/329 |
| 2016/0192350 | A1* | 6/2016 | Yi | H04W 52/146 370/329 |
| 2016/0205632 | A1* | 7/2016 | Yi | H04W 72/10 455/522 |
| 2016/0330010 | A1* | 11/2016 | Qin | H04L 5/0058 |
| 2017/0026912 | A1* | 1/2017 | Lee | H04L 5/0051 |
| 2017/0223695 | A1* | 8/2017 | Kwak | H04W 56/0075 |
| 2017/0302419 | A1* | 10/2017 | Liu | H04W 48/12 |
| 2017/0325277 | A1* | 11/2017 | Fujishiro | H04W 4/06 |
| 2017/0366311 | A1* | 12/2017 | Iyer | H04B 7/0482 |
| 2018/0070369 | A1* | 3/2018 | Papasakellariou | H04B 7/024 |
| 2018/0115957 | A1* | 4/2018 | Lin | H04W 52/365 |
| 2018/0124790 | A1* | 5/2018 | Yerramalli | H04W 16/14 |
| 2018/0359057 | A1* | 12/2018 | Yang | H04L 1/1812 |

OTHER PUBLICATIONS

3rd Generation Partnership Project; TSG-RAN WG1 Meeting #87; R1-1613162; Summary of e-mail discussions on uplink control signaling; Nov. 14-18, 2016.
3rd Generation Partnership Project; TSG RAN WG1 Meeting #87; R1-1613636; WF on PUCCH channelization; Nov. 14-18, 2016.
3rd Generation Partnership Project; TSG RAN WG1 Meeting #87; R1-1613721; Summary of offline discussion on UL control channels; Nov. 14-18, 2016.
3rd Generation Partnership Project; TSG RAN WG1 Meeting #87; R1-1613411; WF on Long Duration PUCCH; Nov. 14-18, 2016.
3rd Generation Partnership Project; TSG-RAN WG1 Meeting #87; R1-1612920; On multiplexing of short UCI and data; Nov. 14-18, 2016.
3rd Generation Partnership Project; TSG-RAN WG1 Meeting #87; R1-1611663; UCI multiplexing on data channel; Nov. 14-18, 2016.
3rd Generation Partnership Project; TSG RAN WG1 Meeting #87; R1-1611699; Multiplexing of UCI and UL data; Nov. 14-18, 2016.
3rd Generation Partnership Project; TSG RAN WG1 Meeting #87; R1-1611841; Multiplexing between UL control and data for NR; Nov. 14-18, 2016.
3rd Generation Partnership Project; TSG RAN WG1 Meeting #87; R1-1611999; UCI embedding onto UL data channels; Nov. 14-18, 2016.
3rd Generation Partnership Project; TSG RAN WG1 Meeting #87; R1-1612140; Multiplexing of PUCCH and other channels; Nov. 14-18, 2016.
3rd Generation Partnership Project; TSG RAN WG1 Meeting #87; R1-1612239; UCI multiplexing in the presence of UL data; Nov. 14-18, 2016.
3rd Generation Partnership Project; TSG RAN WG1 #87; R1-1612530; Discussion on UCI and data multiplexing; Nov. 14-18, 2016.
3rd Generation Partnership Project; TSG RAN WG1 #87; R1-1612918; On long UCI with simultaneous data transmission; Nov. 14-18, 2016.
Huawei, Hisilicon: "Further considerations on non-simultaneous reception and transmission for MTC UEs", R2-156546, 3GPP TSG RAN WG2 Meeting #92, Anaheim, USA, Nov. 15-22, 2015.
Catt: "Discussion on the simultaneous transmissions of (s)PUCCH and (s)PUSCH", R1-1611355, 3GPP TSG RAN WG1 Meeting #87, Reno, USA Nov. 14-18, 2016.

* cited by examiner

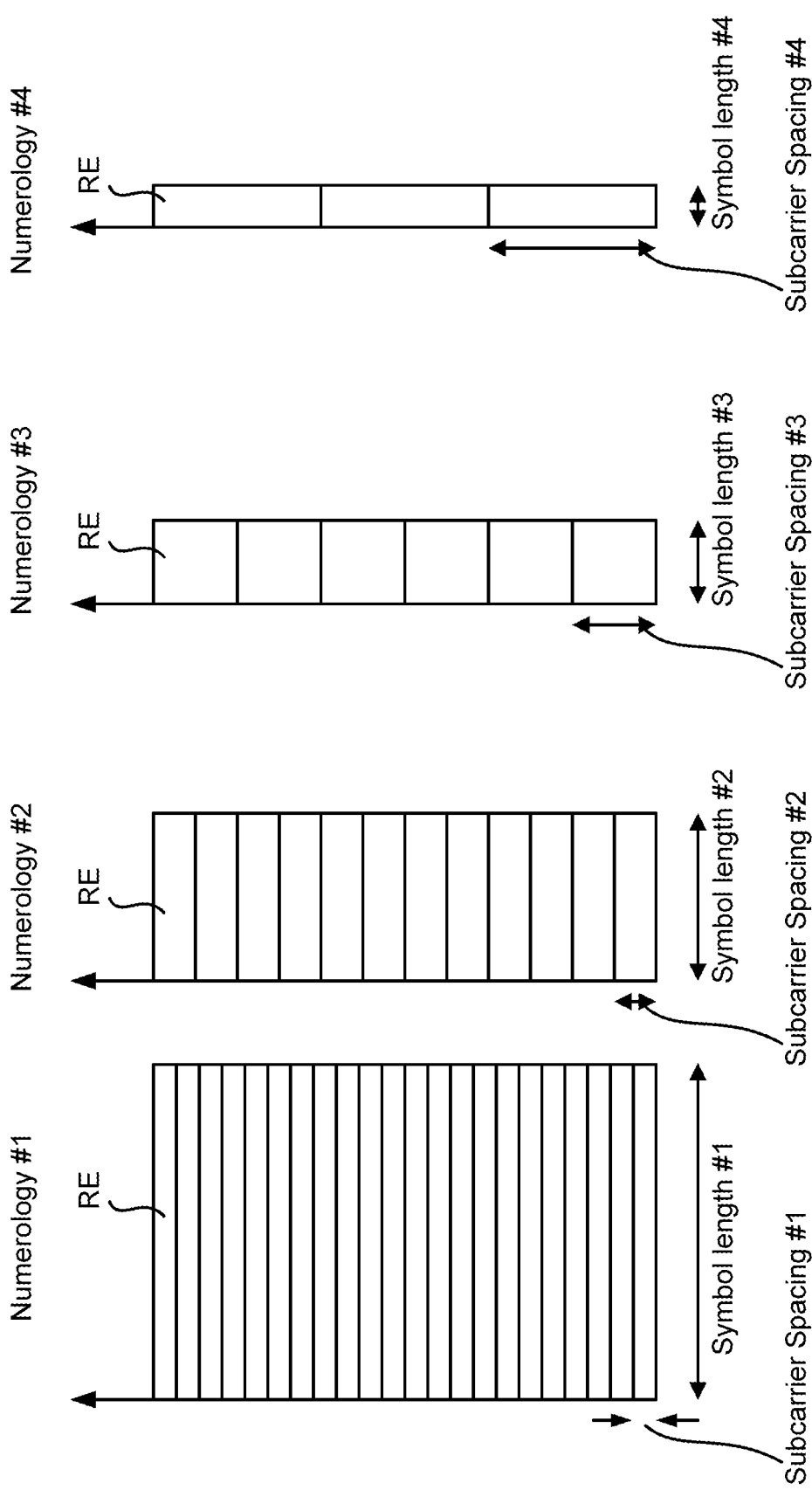

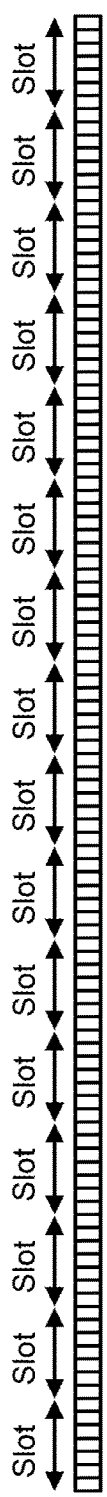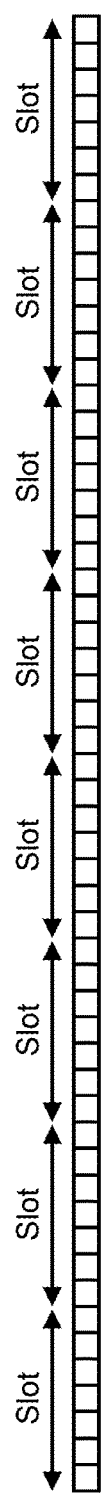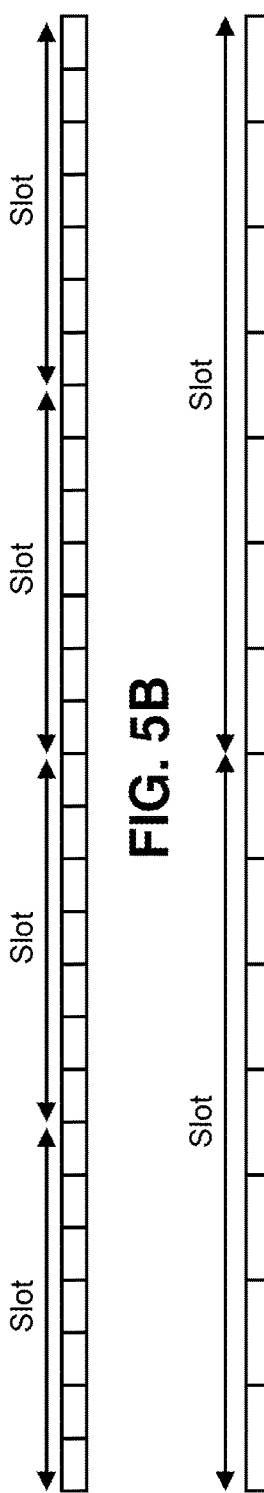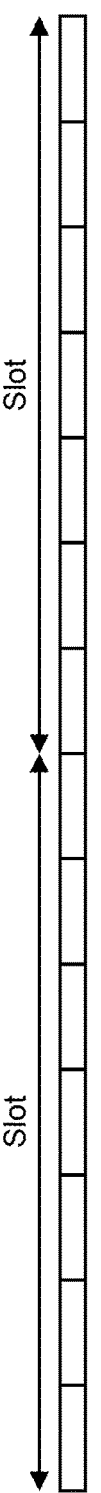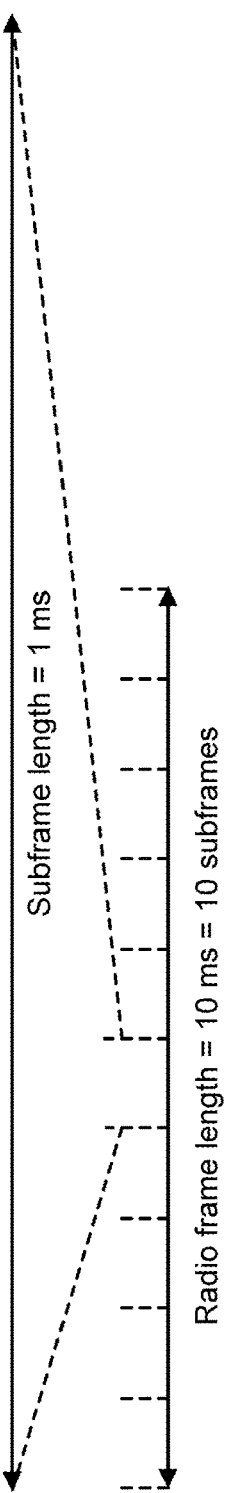

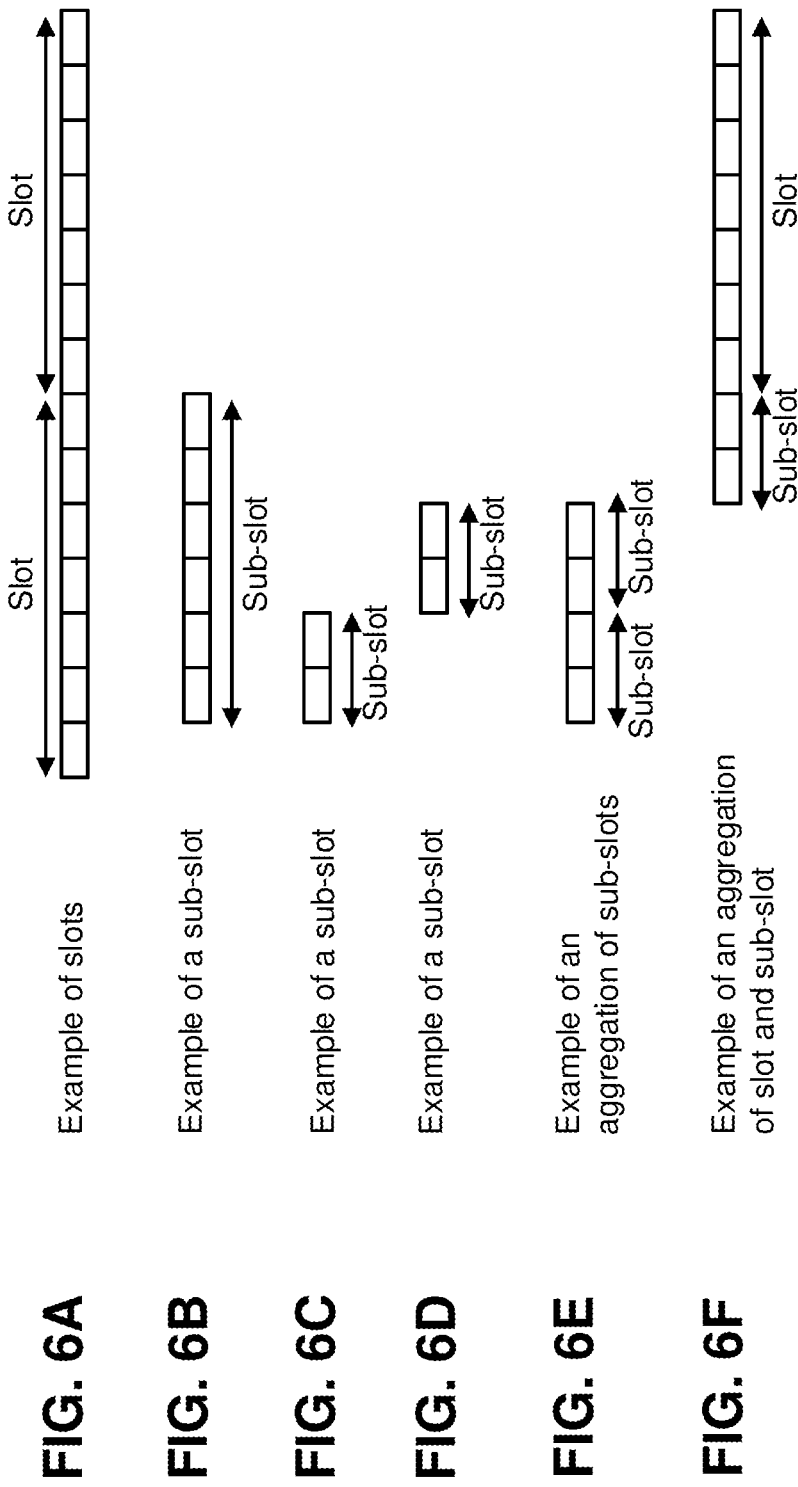

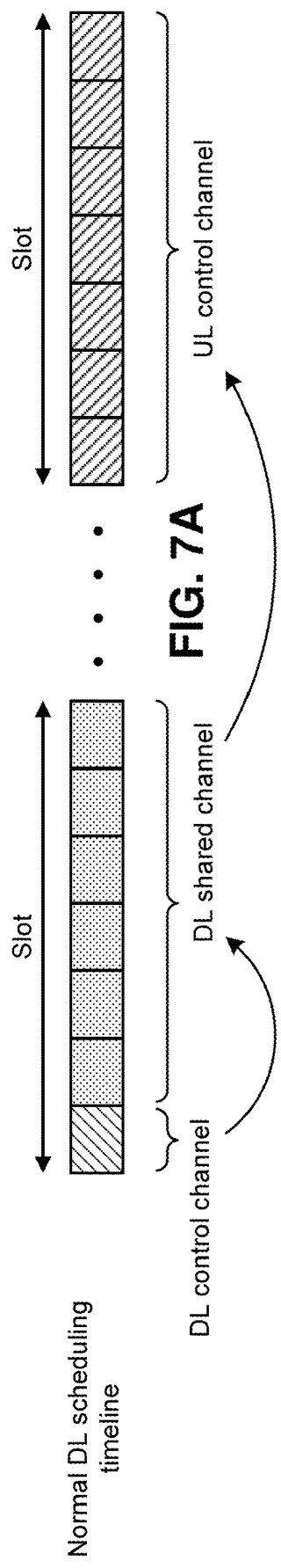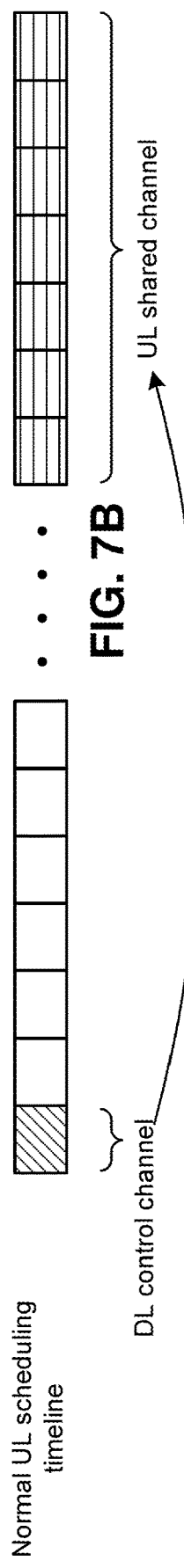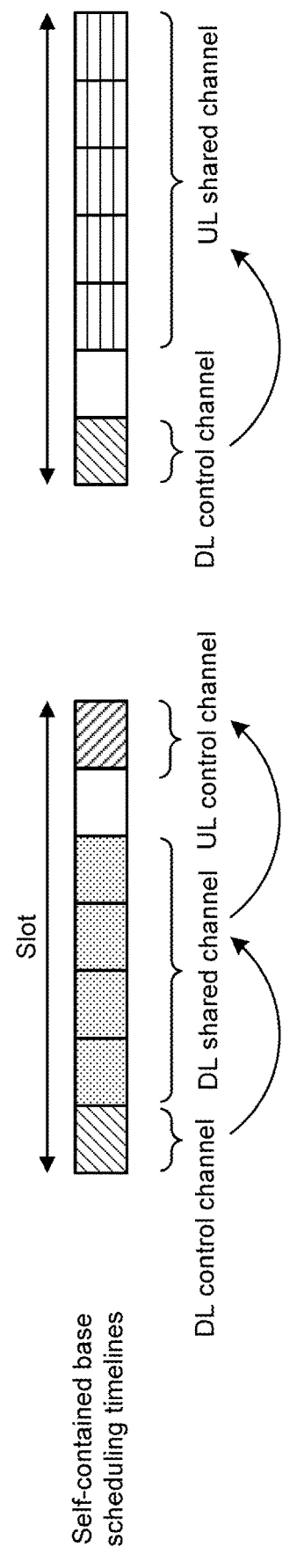

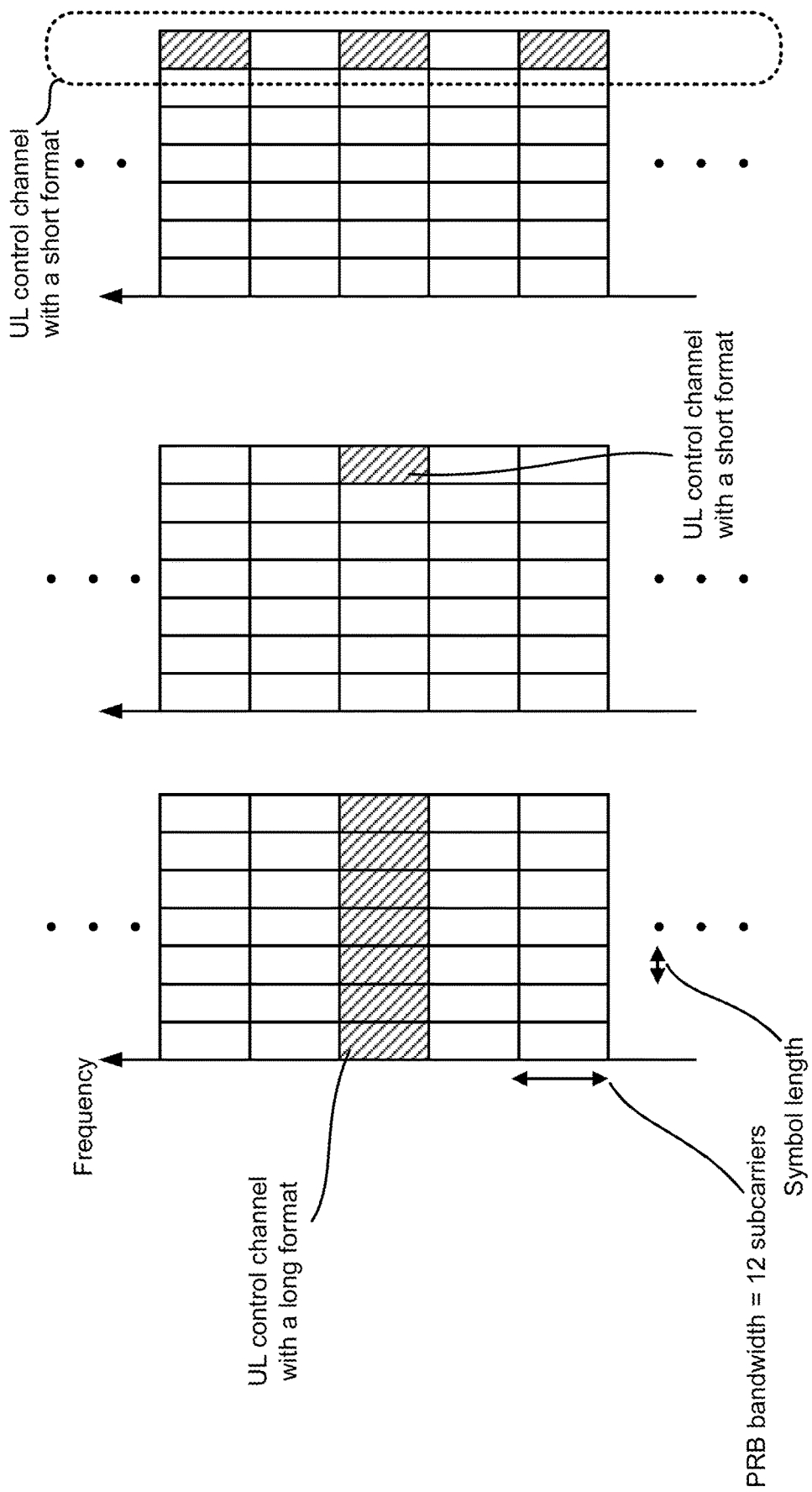

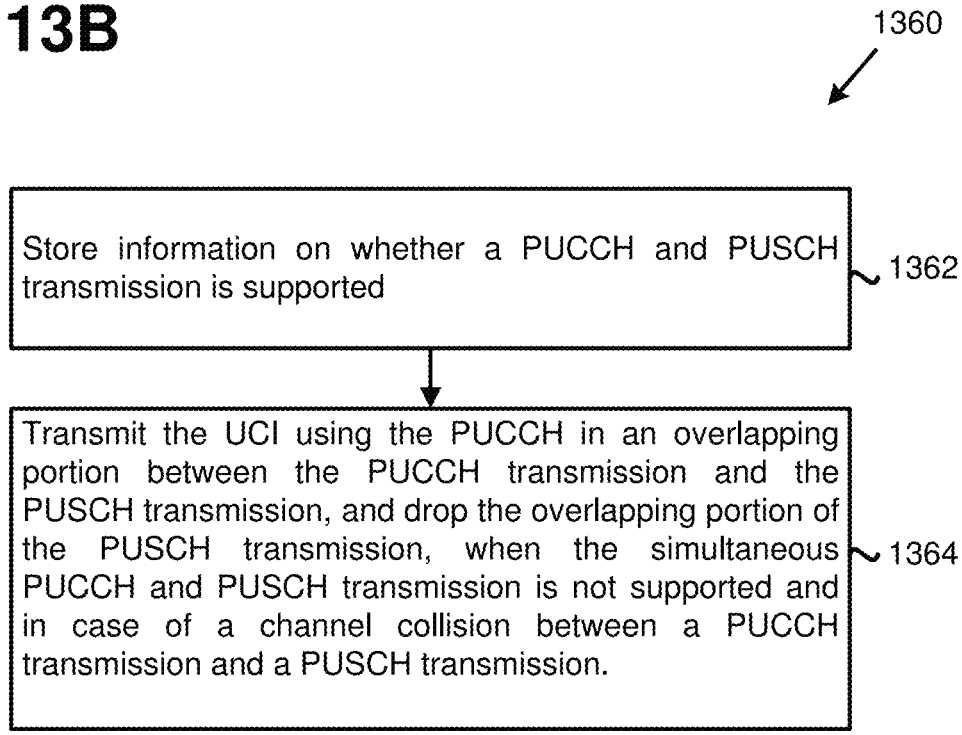
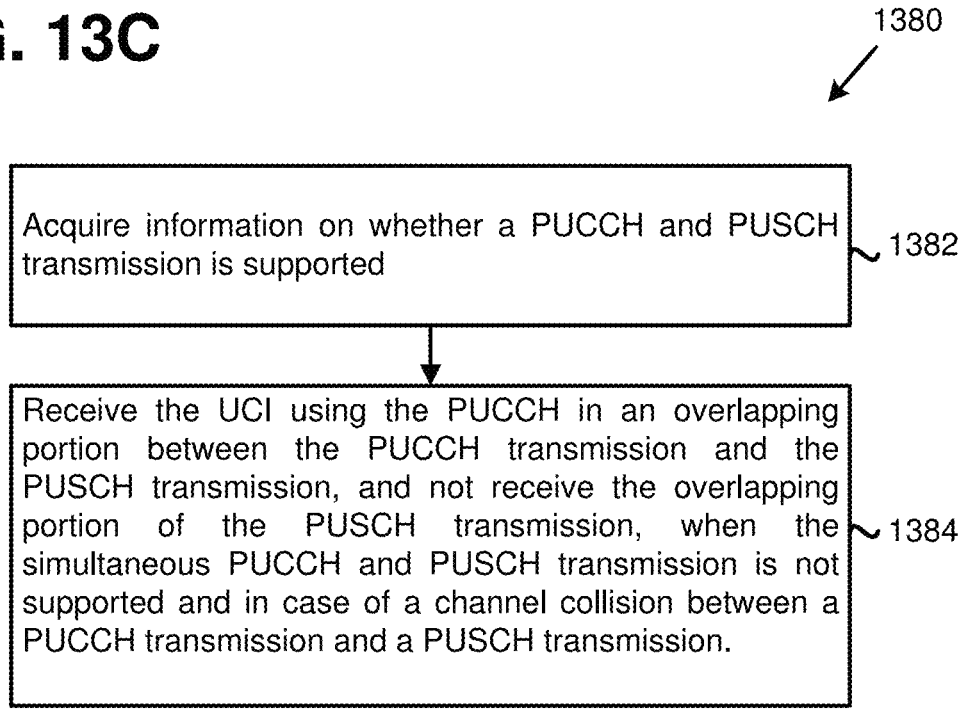

BASE STATIONS, USER EQUIPMENTS, AND RELATED COMMUNICATION METHODS

CROSS-REFERENCE TO RELATED APPLICATION(S)

The present application claims the benefit of and priority to a provisional U.S. Patent Application Ser. No. 62/433,677 filed on Dec. 13, 2016, entitled "BASE STATIONS, USER EQUIPMENTS, AND RELATED COMMUNICATION METHODS," (hereinafter referred to as "SLA3698P application"). The disclosure of the SLA3698P application is hereby incorporated fully by reference into the present application.

TECHNICAL FIELD

The present disclosure relates generally to communication systems. More specifically, the present disclosure relates to a base station apparatus, a user equipment apparatus and related communication methods.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In Long-Term Evolution (LTE), the uplink control information (UCI) carries hybrid-ARQ acknowledgements (HARQ-ACK), Channel-State Information (CSI), and Scheduling Request (SR). In the next generation (e.g., $5^{th}$ generation (5G)) communication networks, such as new radio (NR), the UCI carries HARQ-ACK, SR, Channel Quality Indicator (CQI), Precoding Type Indicator (PTI), Precoding Matrix Indicator (PMI), and Rank Indication (RI). The CSI may include one or more of CQI, RI, PMI, PTI, and etc. Multiple dimensions of CSI may be reported from one or more cells to support full-dimension multiple input multiple output (FD-MIMO) and Coordinated Multi Point (CoMP) operations. Similarly, in NR, SR and HARQ-ACK need to be transmitted outside of physical uplink shared channel (PUSCH) for latency reasons. The CSI report in NR should be enhanced to support massive MIMO and beamforming methods. Thus, multiple sets of CSI may be reported in NR. Again, a CSI feedback may include one or more of CQI, RI, PMI, PTI, beam index, and etc. At least two types of CSI reports may be supported, namely periodic CSI and aperiodic CSI reports. A periodic CSI report can be configured semi-statically, while an aperiodic CSI report can be triggered with a CSI request from a base station. Therefore, physical uplink control signaling should be able to carry at least HARQ-ACKs, CSI reports (possibly including beamforming information), and SRs.

These multiple access technologies have been adopted in various telecommunication standards to provide a common protocol that enables different wireless devices to communicate on a municipal, national, regional, and even global level. With the emerging telecommunication standard of NR, there is a need in the art for a transmission method that can better support wireless communication by improving spectral efficiency, lowering costs, improving services, making use of new spectrum, and better integrating with other open standards using Orthogonal Frequency Division Multiple Access (OFDMA) on the downlink (DL), Single Carrier Frequency Division Multiple Access (SC-FDMA) on the uplink (UL), and multiple-input multiple-output (MIMO) antenna technology.

BRIEF DESCRIPTION OF THE DRAWINGS

Implementations of the present technology will now be described, by way of example only, with reference to the attached figures.

FIGS. 4A, 4B, 4C, and 4D show examples of several numerologies.

FIGS. 5A, 5B, 5C, and 5D show examples of subframe structures.

FIGS. 6A, 6B, 6C, 6D, 6E, and 6F show examples of slots and sub-slots.

FIGS. 7A, 7B, 7C, and 7D show examples of scheduling timelines.

FIGS. 10A, 10B, and 10C show examples of uplink control channel structures.

FIG. 13B is a schematic diagram illustrating an exemplary implementation of a flow chart of a method, performed by the UE in FIG. 12, for reporting UCI.

FIG. 13C is a schematic diagram illustrating an exemplary implementation of a flow chart of a method, performed by the gNB in FIG. 11, for receiving UCI from a UE.

DETAILED DESCRIPTION

Figure 1:
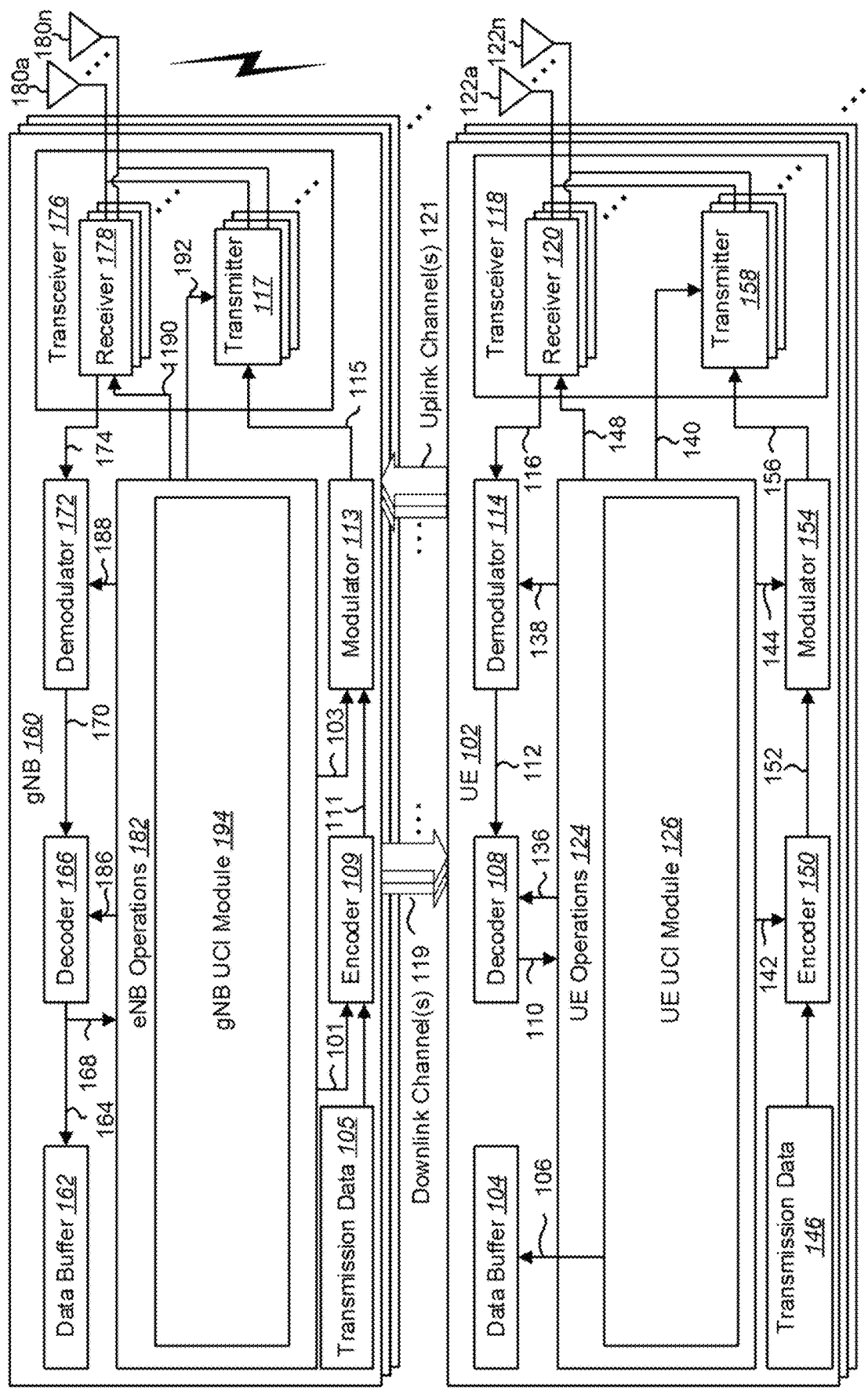
FIG. 1 is a block diagram illustrating one implementation of one or more next generation NodeBs (gNBs) and one or more user equipments (UEs) in which systems and methods for UCI operations may be implemented.

A user equipment (UE) is described. The UE is configured to report uplink control information (UCI). The UE includes a processor, such as a higher layer processor, and a non-transitory machine-readable memory storing instructions, executable by the processor, for storing information on whether a simultaneous physical uplink control channel (PUCCH) and physical uplink shared channel (PUSCH) transmission is supported. When the simultaneous PUCCH and PUSCH transmission is not supported and in case of a channel collision between a PUCCH transmission and a PUSCH transmission, the instructions include transmitting the UCI using the PUCCH in an overlapping portion between the PUCCH and the PUSCH, and dropping the overlapping portion of the PUSCH. The instructions further include determining a PUCCH format and a configuration of the PUCCH based on a signaling from a next generation NodeB (gNB). The PUCCH format is determined from a short PUCCH format and a long PUCCH format. The PUCCH format is determined based on whether the PUCCH and the PUSCH have the same or different waveforms and/or numerologies. The channel collision occurs when there is at least one overlapping symbol between the PUSCH and the PUCCH. The information on whether the simultaneous PUCCH and PUSCH transmission is supported, is either the UE's capability or a base station's configuration. When the simultaneous PUCCH and PUSCH transmission is not supported, and when the channel collision occurs, the UE is configured to transmit a non-overlapping portion of the PUSCH.

A base station is described. The base station is configured to acquire uplink control information (UCI) from a user equipment (UE). The base station includes a processor, and a non-transitory machine-readable memory storing instructions, executable by the processor, for acquiring information on whether a simultaneous physical uplink control channel (PUCCH) and physical uplink shared channel (PUSCH) transmission is supported by the UE. When the simultaneous PUCCH and PUSCH transmission is not supported and in case of a channel collision between a PUCCH and a PUSCH, the instructions include receiving the UCI using the PUCCH in an overlapping portion between the PUCCH and the PUSCH, and not receiving the overlapping portion of the PUSCH. A PUCCH format and a configuration of the PUCCH from the UE are determined based on a signaling from the base station. The PUCCH format is determined from a short PUCCH format and a long PUCCH format. The PUCCH format is determined based on whether the PUCCH and the PUSCH have the same or different waveforms and/or numerologies. The channel collision occurs when there is at least one overlapping symbol between the PUSCH and the PUCCH. The information on whether the simultaneous PUCCH and PUSCH transmission is supported, is either the UE's capability or the base station's configuration. When the simultaneous PUCCH and PUSCH transmission is not supported, and when the channel collision occurs, the base station is configured to receive a non-overlapping portion of the PUSCH.

A method for reporting uplink control information (UCI) by a user equipment (UE) is described. The method includes storing information on whether a simultaneous physical uplink control channel (PUCCH) and physical uplink shared channel (PUSCH) transmission is supported. The method also includes, when the simultaneous PUCCH and PUSCH transmission is not supported and in case of a channel collision between a PUCCH and a PUSCH, transmitting, by the UE, the UCI using the PUCCH in an overlapping portion between the PUCCH and the PUSCH, and dropping the overlapping portion of the PUSCH.

A method for receiving uplink control information (UCI) from a user equipment (UE) by a base station is described. The method includes acquiring information on whether a simultaneous physical uplink control channel (PUCCH) and physical uplink shared channel (PUSCH) transmission is supported by the UE. The method also includes, when the simultaneous PUCCH and PUSCH transmission is not supported and in case of a channel collision between a PUCCH and a PUSCH, receiving the UCI using the PUCCH in an overlapping portion between the PUCCH and the PUSCH, and not receiving the overlapping portion of the PUSCH.

A method for reporting uplink control information (UCI) by a user equipment (UE) in case of a channel collision between a physical uplink control channel (PUCCH) transmission and a physical uplink shared channel (PUSCH) transmission is described. The UE includes a processor and a non-transitory machine-readable memory storing instructions executable by the processor. the method includes determining, by the processor, whether a simultaneous PUCCH and PUSCH transmission is supported. When the simultaneous PUCCH and PUSCH transmission is not supported, the method includes performing one of (1) transmitting, by the UE, the UCI using the PUCCH in an overlapping portion between the PUCCH and the PUSCH, and not transmitting the overlapping portion of the PUSCH, and (2) transmitting, by the UE, the UCI using the PUSCH by multiplexing the UCI on the overlapping portion of the PUSCH. The determining whether the simultaneous PUCCH and PUSCH transmission is supported includes determining a format and a configuration of the PUCCH based on a signaling from a next generation NodeB (gNB), and determining a format and a configuration of the PUSCH based on a signaling from the gNB. The format of the PUCCH comprises a short PUCCH format and a long PUCCH format, the short PUCCH format and long PUCCH format each have a waveform and a numerology. The determining whether the simultaneous PUCCH and PUSCH transmission is supported comprises determining whether a format of the PUCCH and a format of the PUSCH have the same or different waveforms and/or numerologies. The method further includes determining, by the processor, whether the collision between the PUCCH and the PUSCH occurs, wherein the collision occurs when there is at least one overlapping symbol between the PUSCH and the PUCCH. The determining whether the simultaneous PUCCH and PUSCH transmission is supported is based on the UE's capability or the gNB's configuration. The simultaneous PUCCH and PUSCH transmission is not supported when the PUCCH and the PUSCH are configured with different waveforms, or the PUCCH and the PUSCH are configured with Discrete Fourier Transform-Spreading-Orthogonal Frequency Division Multiple (DFT-S-OFDM), but have different numerologies. The simultaneous PUCCH and PUSCH transmission is supported when the PUCCH and the PUSCH are configured with DFT-S-OFDM waveforms and the same numerology. The simultaneous PUCCH and PUSCH transmission is supported when the PUCCH and the PUSCH are configured with Cyclic Prefix (CP)-OFDM waveforms. When the simultaneous PUCCH and PUSCH transmission is not supported, and when the collision occurs, the UE is configured to transmit a non-overlapping portion of the PUSCH. When the UCI is transmitted using the PUSCH by multiplexing the UCI on the overlapping portion of the PUSCH, the PUCCH is not transmitted. When the simultaneous PUCCH and PUSCH transmission is supported, when the PUCCH and the PUSCH have the overlapping portion, and when power is limited, the UE is configured to allocate the power to transmit the PUCCH, and after transmitting the PUCCH, allocate the remaining power to transmit the PUSCH with power scaling in symbols of the overlapping portion.

A user equipment (UE) for reporting uplink control information (UCI) in case of a channel collision between a physical uplink control channel (PUCCH) and a physical uplink shared channel (PUSCH) is described. The UE includes a processor, and a non-transitory machine-readable memory storing instructions, executable by the processor, for determining, by the processor, whether a simultaneous PUCCH and PUSCH transmission is supported. The method also includes, when the simultaneous PUCCH and PUSCH transmission is not supported, performing one of (1) transmitting the UCI using the PUCCH in an overlapping portion between the PUCCH and the PUSCH, and not transmitting the overlapping portion of the PUSCH, and (2) transmitting the UCI using the PUSCH by multiplexing the UCI on the overlapping portion of the PUSCH. The determining whether the simultaneous PUCCH and PUSCH transmission is supported includes determining a format and a configuration of the PUCCH based on a signaling from a next generation NodeB (gNB), and determining a format and a configuration of the PUSCH based on a signaling from the gNB. The format of the PUCCH comprises a short PUCCH format and a long PUCCH format, the short PUCCH format and long PUCCH format each have a waveform and a numerology. The determining whether the simultaneous PUCCH and PUSCH transmission is supported comprises determining whether a format of the PUCCH and a format of the PUSCH have the same or different waveforms and/or numerologies. The collision occurs when there is at least one overlapping symbol between the PUSCH and the PUCCH. The determining whether the simultaneous PUCCH and PUSCH transmission is supported is based on the UE's capability or the gNB's configuration. The simultaneous PUCCH and PUSCH transmission is not supported when the PUCCH and the PUSCH are configured with different waveforms, or when the PUCCH and the PUSCH are configured with Discrete Fourier Transform-Spreading-Orthogonal Frequency Division Multiple (DFT-S-OFDM), but have different numerologies. The simultaneous PUCCH and PUSCH transmission is supported when the PUCCH and the PUSCH are configured with DFT-S-OFDM waveforms and the same numerology. The simultaneous PUCCH and PUSCH transmission is supported when the PUCCH and the PUSCH are configured with Cyclic Prefix (CP)-OFDM waveforms. The simultaneous PUCCH and PUSCH transmission is not supported, and when the collision occurs, the UE is configured to transmit a non-overlapping portion of the PUSCH. The UCI is transmitted using the PUSCH by multiplexing the UCI on the overlapping portion of the PUSCH, the PUCCH is not transmitted. The simultaneous PUCCH and PUSCH transmission is supported, when the PUCCH and the PUSCH have the overlapping portion, and when power is limited, the UE is further configured to allocate the power to transmit the PUCCH, and after transmitting the PUCCH, allocate the remaining power to transmit the PUSCH with power scaling in symbols of the overlapping portion.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary implementations described herein. However, it will be understood by those of ordinary skill in the art that the exemplary implementations described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary implementations described herein.

FIG. 1 is a block diagram illustrating one implementation of one or more next generation NodeBs (gNBs) 160 and one or more user equipments (UEs) 102 in which systems and methods for UCI operations may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a physical downlink control channel (PDCCH), a physical downlink shared channel (PDSCH), etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE UCI module 126.

The UE UCI module 126 may perform UCI operations. UCI operations may include UCI generation, UCI multiplexing, UCI dropping, UCI compression, etc.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in the gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce decoded signals 168 and a gNB-decoded signal 164 (also referred to as a first gNB-decoded signal 164). For example, the first gNB-decoded signal 164 may comprise received payload data, which may be stored in a data buffer 162. Another signal included in the decoded signals 168 (also referred to as a second gNB-decoded signal 168) may comprise overhead data and/or control data. For example, the second gNB decoded signal 168 may provide data that may be used by the gNB operations module 182 to perform one or more operations.

The gNB operations module 182 may enable the gNB 160 to communicate with the one or more UEs 102. The gNB operations module 182 may include one or more of a gNB UCI module 194.

The gNB UCI module 194 may perform UCI operations. UCI operations may include UCI extraction, UCI de-multiplexing, UCI reconstruction, UCI recompression, etc.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may comprise multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

Figure 2:
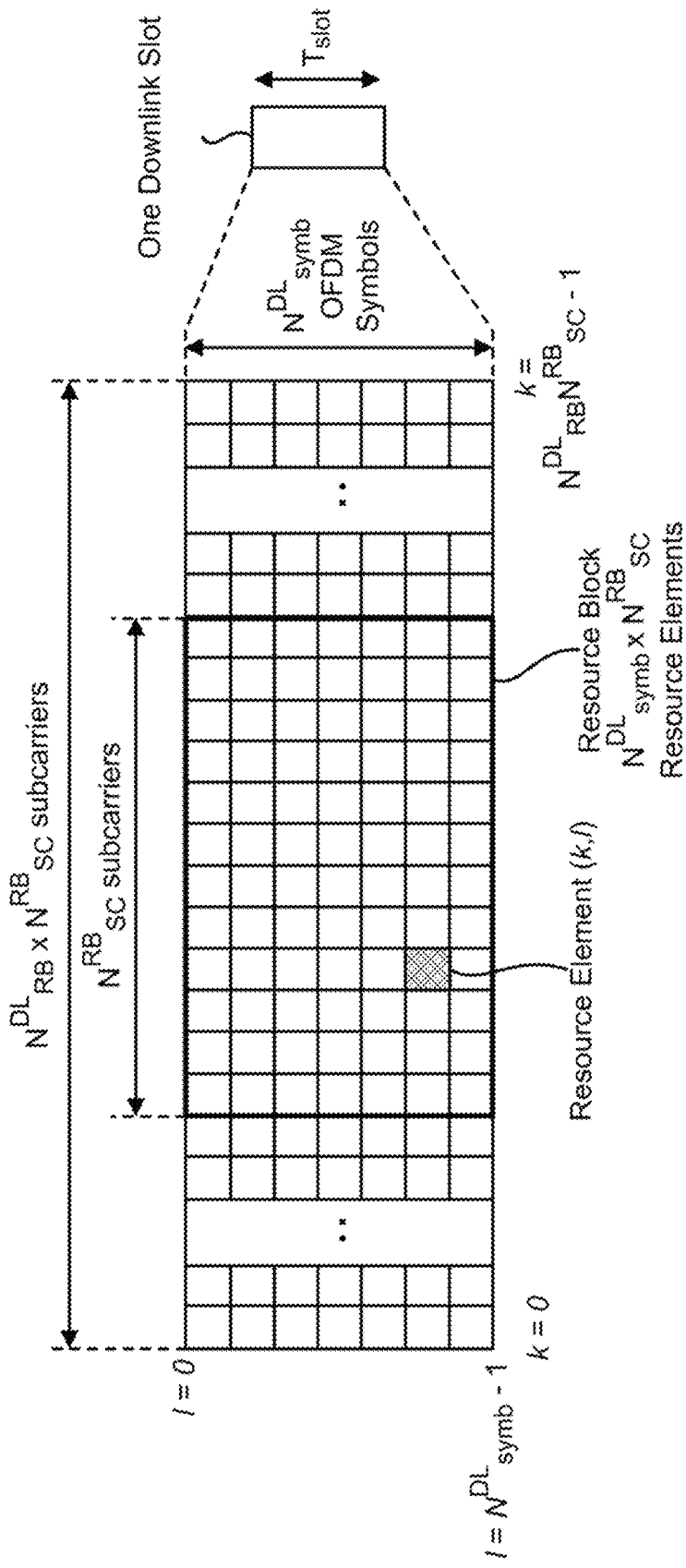
FIG. 2 is an example of a resource grid for a downlink.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid in a downlink is discussed in connection with FIG. 2.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may comprise multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

Figure 3:
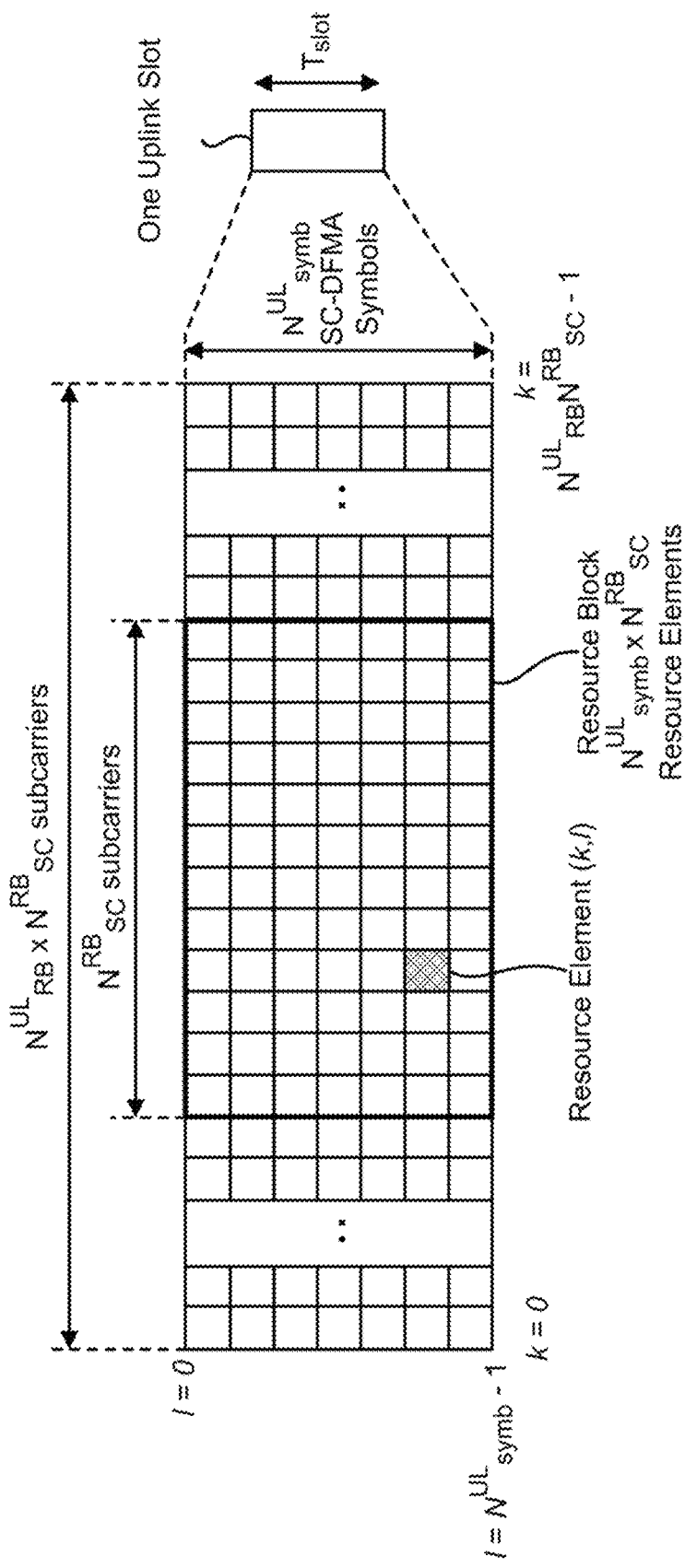
FIG. 3 is an example of a resource grid for an uplink.

The uplink RB may comprise twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in an uplink is discussed in connection with FIG. 3.

FIGS. 4A, 4B, 4C, and 4D show examples of several numerologies. The numerology #1 may be a basic numerology. For example, a RE of the basic numerology is defined with subcarrier spacing of 15 kHz in frequency domain and 2048 Ts+CP length (e.g., 160 Ts or 144 Ts) in time domain, where Ts denotes a baseband sampling time unit defined as 1/(15000*2048) seconds. For the i-th numerology, the sub-carrier spacing may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or 144*2$^{-i}$*Ts). In other words, the subcarrier spacing of the i+1-th numerology is a double of the one for the i-th numerology, and the symbol length of the i+1-th numerology is a half of the one for the i-th numerology. FIGS. 4A, 4B, 4C, and 4D show four numerologies, but the system may support another number of numerologies. Furthermore, the system does not have to support all of the 0-th to the I-th numerologies, i=0, 1, . . . , I.

FIGS. 5A, 5B, 5C, and 5D show examples of subframe structures for the numerologies that are shown in FIGS. 4A, 4B, 4C, and 4D, respectively. Given that a slot consists of $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may consists of 10 subframes, and the radio frame length may be equal to 10 ms.

FIGS. 6A, 6B, 6C, 6D, 6E and 6F show examples of slots and sub-slots. If sub-slot is not configured by higher layer signaling, the UE and the gNB may only use a slot as a scheduling unit. More specifically, a given transport block may be allocated to a slot. If the sub-slot is configured by higher layer signaling, the UE and the gNB may use the sub-slot as well as the slot. The sub-slot may comprise one or more OFDM symbols. The maximum number of OFDM symbols that constitute the sub-slot may be $N^{DL}_{symb}$-1 (or $N^{UL}_{symb}$-1). The sub-slot length may be configured by higher layer signaling. Alternatively, the sub-slot length may be indicated by a physical layer control channel (e.g., by DCI format). The sub-slot may start at any symbol within a slot unless it collides with a control channel. There could be restrictions of mini-slot length based on restrictions on the starting position. For example, the sub-slot with the length of $N^{DL}_{symb}$-1 (or $N^{UL}_{symb}$-1) may start at the second symbol in a slot. The starting position of a sub-slot may be indicated by a physical layer control channel (e.g., by DCI format). Alternatively, the starting position of a sub-slot may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot. In cases when the sub-slot is configured, a given transport block may be allocated to either a slot, a sub-slot, aggregated sub-slots or aggregated sub-slot(s) and slot. This unit may also be a unit for HARQ-ACK bit generation.

FIGS. 7A, 7B, 7C, and 7D show examples of scheduling timelines. For a normal DL scheduling timeline, DL control channels are mapped the initial part of a slot. The DL control channels schedule DL shared channels in the same slot. HARQ-ACKs for the DL shared channels (i.e., HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline, DL control channels are mapped the initial part of a slot. The DL control channels schedules DL shared channels in the same slot. HARQ-ACKs for the DL shared channels are reported UL control channels which are mapped at the ending part of the slot. For a self-contained base UL scheduling timeline, DL control channels are mapped the initial part of a slot. The DL control channels schedules UL shared channels in the same slot. For these cases, The slot may contain DL and UL portions, and there may be a guard period between the DL and UL transmissions. The use of self-contained slot may be upon a configuration of self-contained slot. Alternatively, the use of self-contained slot may be upon a configuration of the sub-slot. Yet alternatively, the use of self-contained slot may be upon a configuration of shortened physical channel (e.g., PDSCH, PUSCH, PUCCH, etc.).

Figure 8B:
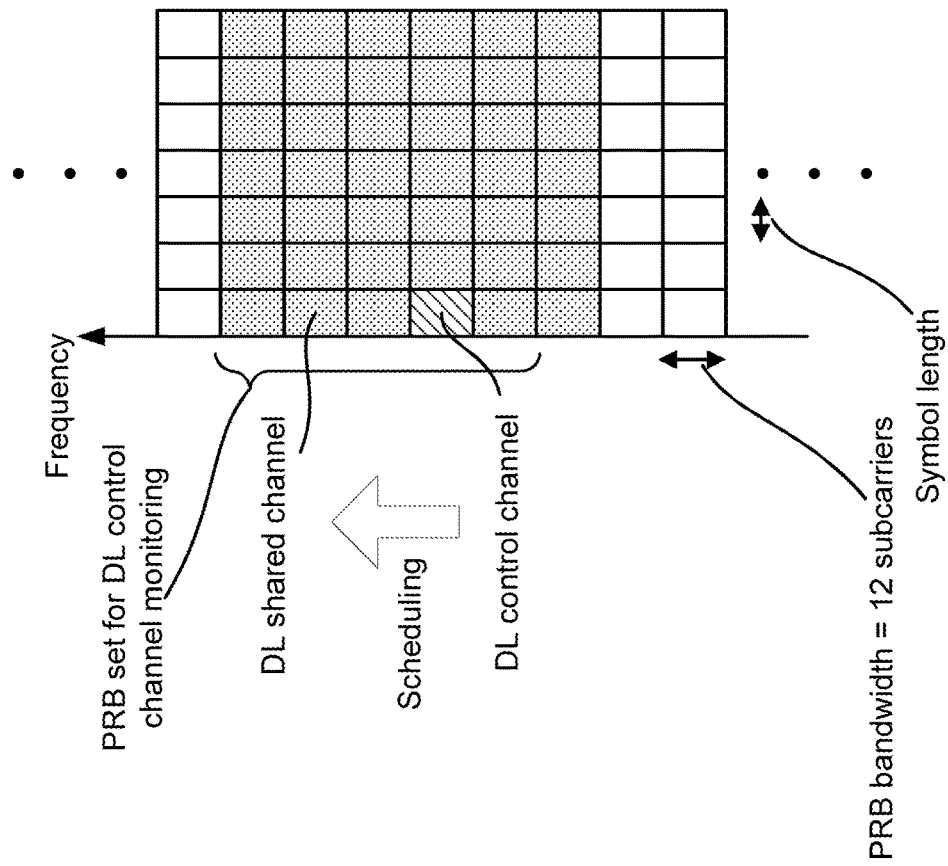
FIGS. 8A and 8B show examples of downlink control channel monitoring regions.
Figure 8A:
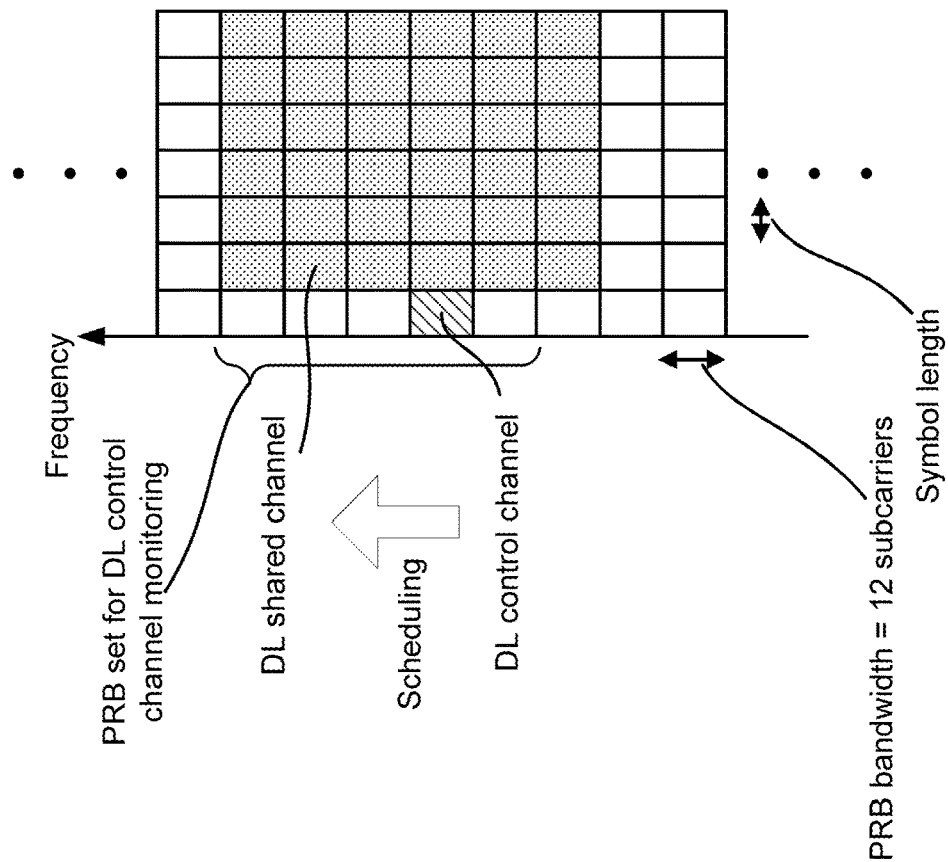

FIGS. 8A and 8B show examples of DL control channel monitoring regions. One or more sets of PRB(s) may be configured for DL control channel monitoring. For example, a control resource set is, in the frequency domain, a set of PRBs within which the UE attempts to blindly decode downlink control information, where the PRBs may or may not be frequency contiguous, a UE may have one or more control resource sets, and one DCI message may be located within one control resource set. In frequency-domain, a PRB is the resource unit size (may or may not including DM-RS) for control channel. DL shared channel may start at a later OFDM symbol than the one(s) which carries the detected DL control channel. Alternatively, the DL shared channel may start at or an earlier OFDM symbol than the last OFDM symbol which carries the detected DL control channel. For example, dynamic reuse of at least part of resources in the control resource sets for data for the same or a different UE, at least in the frequency domain may be supported.

Figure 9B:
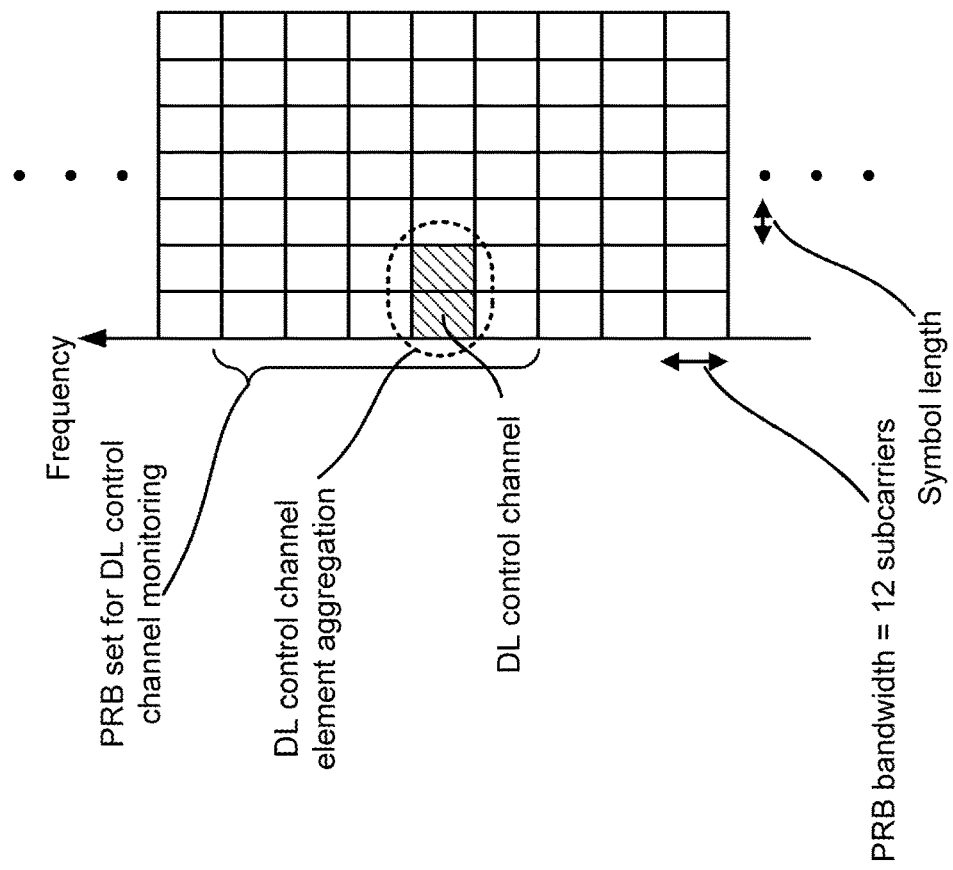
FIGS. 9A and 9B show examples of downlink control channel each having more than one control channel elements.
Figure 9A:
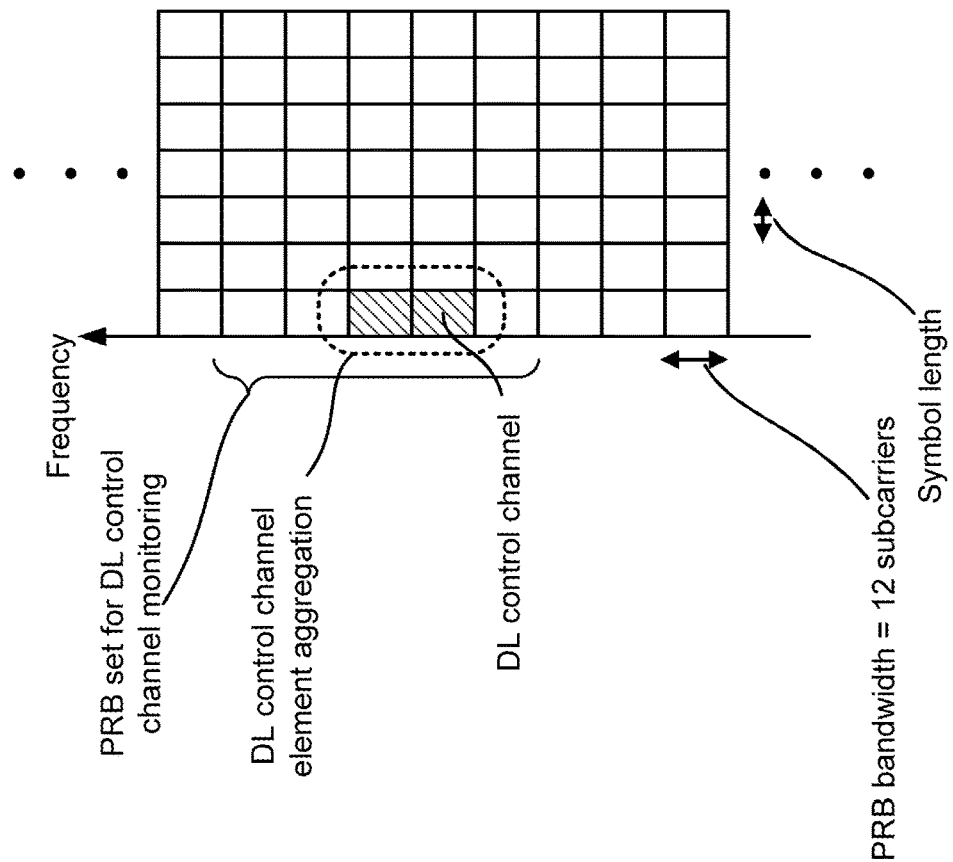

FIGS. 9A and 9B show examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed. The number of aggregated DL control channel elements is referred to as DL control channel element aggregation level. The DL control channel element aggregation level may be 1 or 2 to the power of an integer. The gNB may inform UE of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

FIGS. 10A, 10B, and 10C show examples of UL control channel structures. UL control channel may be mapped on REs which are defined by a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs with in a single PRB. Alternatively, the UL control channels with a short format may be mapped on REs with in multiple PRBs. For example, interlaced mapping may be applied, namely the UL control channel may be mapped to every N PRBs (e.g., 5 PRBs or 10 PRBs) within a system bandwidth.

Figure 11:
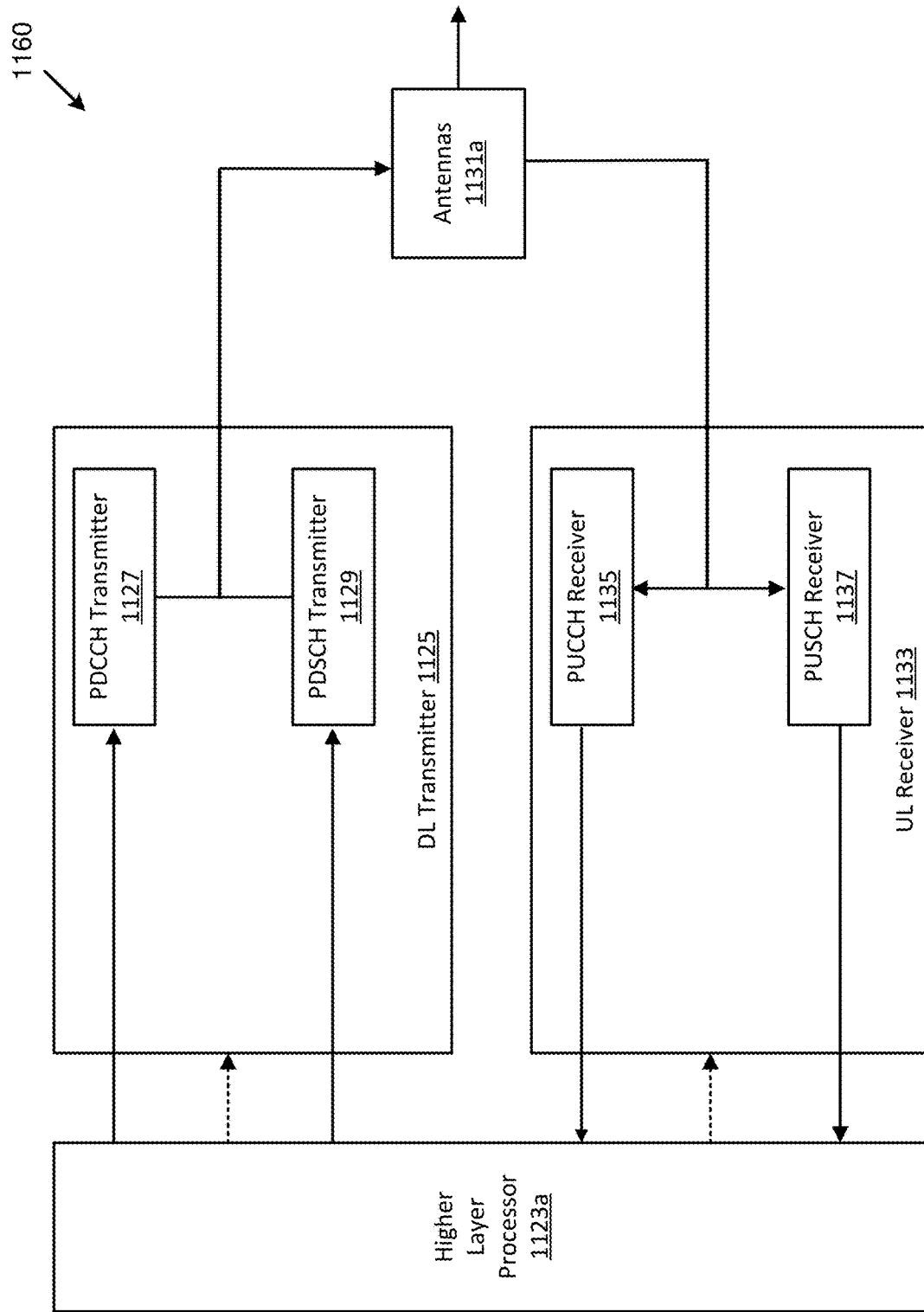
FIG. 11 is a block diagram illustrating one implementation of a gNB.

FIG. 11 is a block diagram illustrating one implementation of a gNB. In FIG. 11, a gNB 1160 may substantially correspond to the gNB 160 in FIG. 1. As shown in FIG. 11, the gNB 1160 may include a higher layer processor 1123a, a DL transmitter 1125, a UL receiver 1133, and antennas 1131a. The DL transmitter 1125 may include a PDCCH transmitter 1127 and a PDSCH transmitter 1129. The UL receiver 1133 may include a PUCCH receiver 1135 and a PUSCH receiver 1137. The higher layer processor 1123a may manage physical layer's behaviors (the DL transmitter 1125's and the UL receiver 1133's behaviors) and provide higher layer parameters to the physical layer. The higher layer processor 1123a may obtain transport blocks from the physical layer. The higher layer processor 1123a may send/acquire higher layer messages such as an RRC message and MAC message to/from a UE's higher layer. The higher layer processor 1123a may provide the PDSCH transmitter 1129 transport blocks and provide the PDCCH transmitter 1127 transmission parameters related to the transport blocks. The UL receiver 1133 may receive multiplexed uplink physical channels and uplink physical signals via receiving antennas 1131a and de-multiplex them. The PUCCH receiver 1135 may provide the higher layer processor UCI. The PUSCH receiver 1137 may provide the higher layer processor received transport blocks.

Figure 12:
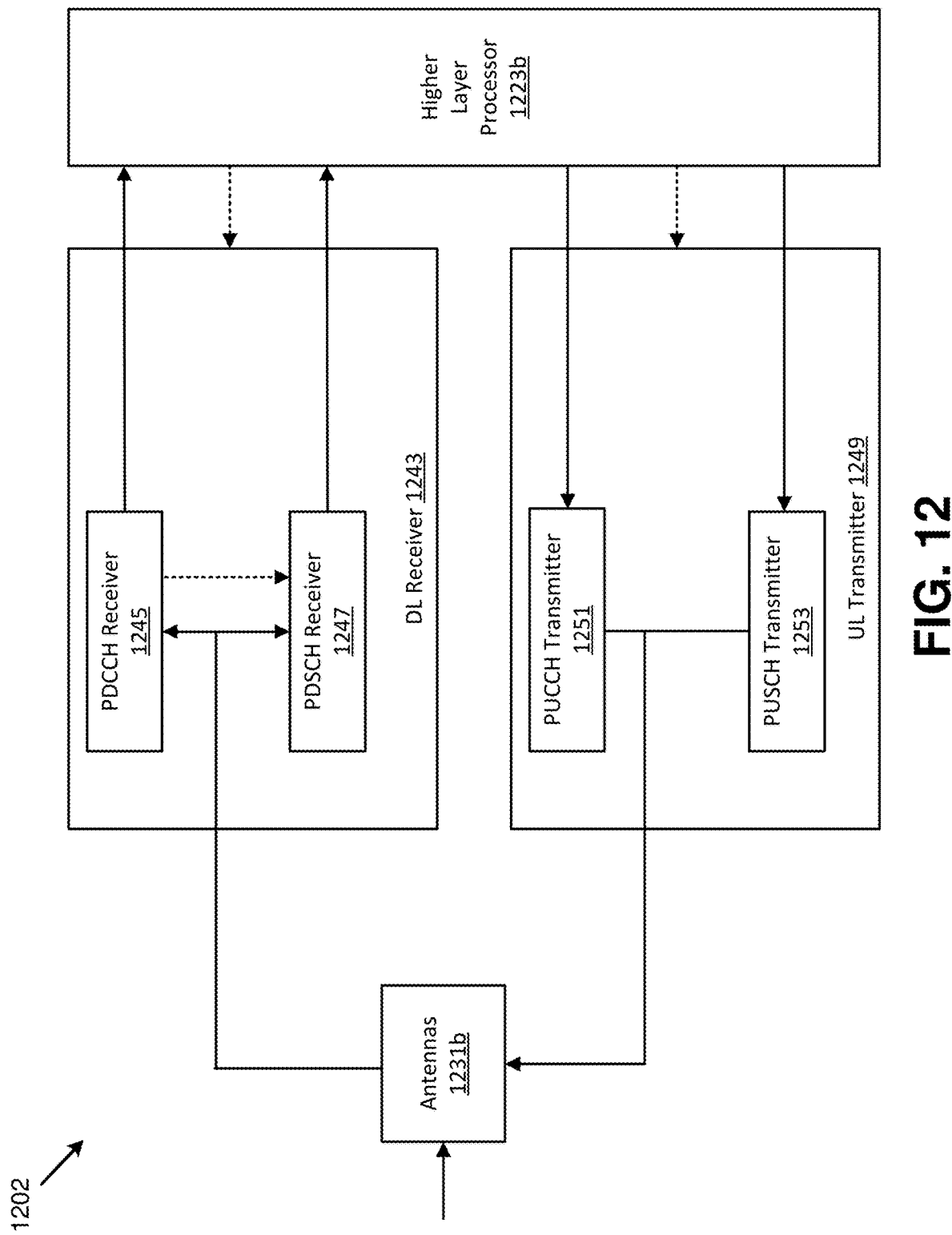
FIG. 12 is a block diagram illustrating one implementation of a UE.

FIG. 12 is a block diagram illustrating one implementation of a UE. In FIG. 12, a UE 1202 may substantially correspond to the UE 102 in FIG. 1. As shown in FIG. 12, the UE1202 may include a higher layer processor 1223b, a UL transmitter 1249, a DL receiver 1243, and antennas 1231b. The UL transmitter 1249 may include a PUCCH transmitter 1251 and a PUSCH transmitter 1253. The DL receiver 1243 may include a PDCCH receiver 1245 and a PDSCH receiver 1247. The higher layer processor 1223b may manage physical layer's behaviors (the UL transmitter 1249's and the DL receiver 1243's behaviors) and provide higher layer parameters to the physical layer. The higher layer processor 1223b may obtain transport blocks from the physical layer. The higher layer processor 1223b may send/acquire higher layer messages such as an RRC message and MAC message to/from a UE's higher layer. The higher layer processor 1223b may provide the PUSCH transmitter 1253 transport blocks and provide the PUCCH transmitter 1251 UCI. The DL receiver 1243 may receive multiplexed downlink physical channels and downlink physical signals via receiving antennas 1231b and de-multiplex them. The PDCCH receiver 1245 may provide the higher layer processor 1223b DCI. The PDSCH receiver 1247 may provide the higher layer processor 1223b received transport blocks.

It should be noted that names of physical channels described herein are examples. The other names such as "NRPDCCH, NRPDSCH, NRPUCCH and NRPUSCH" or the like can be used.

FIG. 13 is a schematic diagram illustrating an exemplary implementation of a flow chart of a method, performed by the UE in FIG. 12, for UCI reporting on PUCCH or PUSCH in case of channel overlap or collision on a single carrier or serving cell.

Figure 13A:
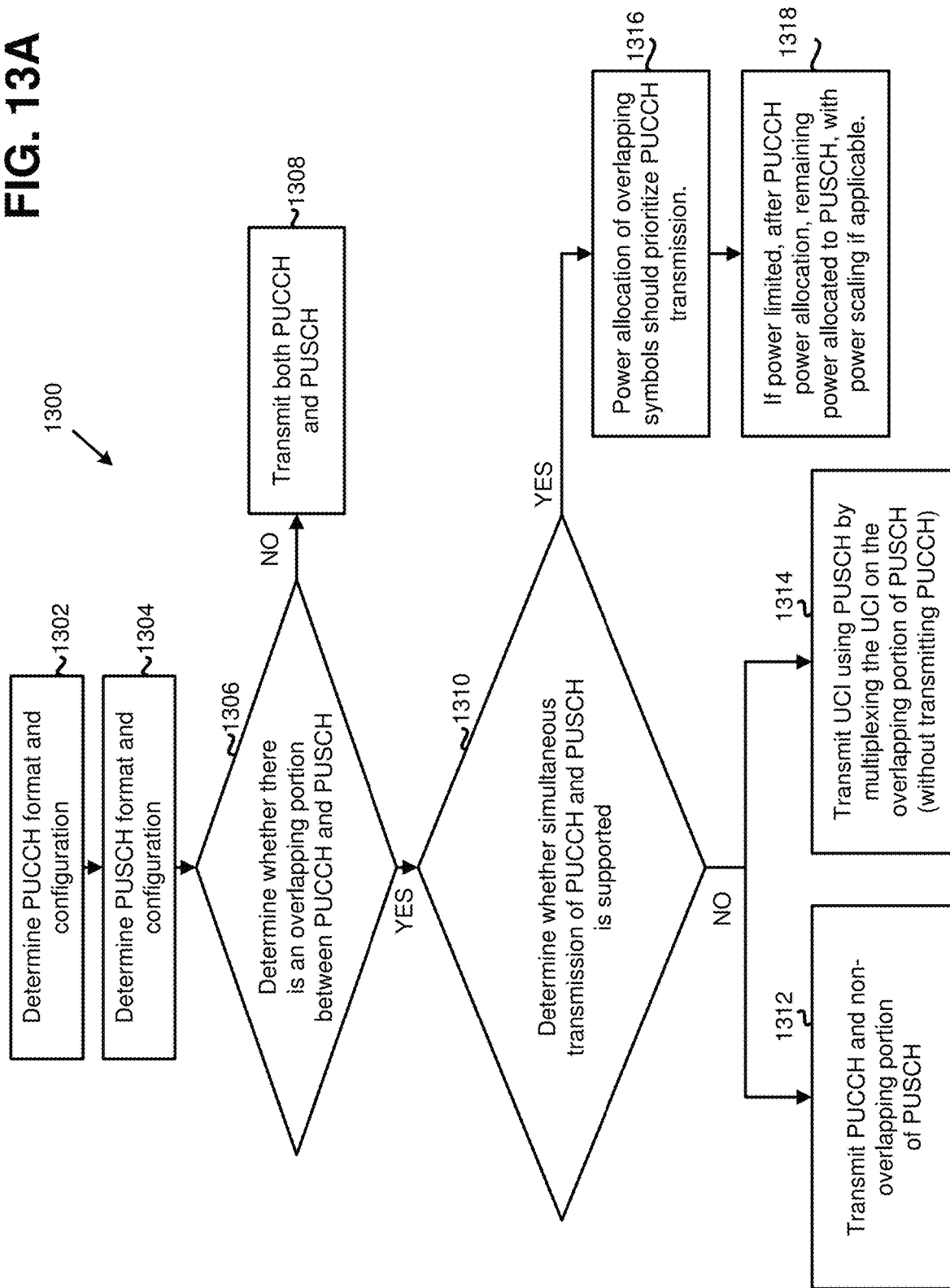
FIG. 13A is a schematic diagram illustrating an exemplary implementation of a flow chart of a method, performed by the UE in FIG. 12, for UCI reporting on PUCCH or PUSCH in case of channel overlap or collision on a single carrier or serving cell.

In a method 1300, an exemplary process of UCI reporting on PUCCH or PUSCH in case of a channel overlap or collision is provided by way of example, as there are a variety of ways to carry out the method. Each block shown in FIG. 13A represents one or more processes, methods, or subroutines, carried out in the exemplary processing method. Additionally, the illustrated order of blocks is by example only and the order of the blocks can change. The method 1300 for UCI reporting on PUCCH or PUSCH in case of a channel overlap or collision includes blocks 1302, 1304, 1306, 1308, 1310, 1312, 1314, 1316, and 1318.

In the block 1302, the format and configuration of a PUCCH transmission is determined based on a signaling from a gNB (e.g., gNB 1160 in FIG. 11). In the block 1302, the format, waveform, numerology, and configuration of the UCI in the PUCCH transmission are determined.

In the block 1304, the format and configuration of a PUSCH transmission is determined based on a signaling from the gNB (e.g., gNB 1160 in FIG. 11). In the block 1304, the format, waveform, and numerology, and configuration of the UCI in the PUSCH transmission are determined.

In the block 1306, the UE determines whether there is an overlapping portion between the PUSCH and PUCCH transmissions. An overlapping portion exists, for example, when there are one or more overlapping symbols, for example, in time domain. If it is determined that no overlapping portion is present, the PUSCH and PUCCH are transmitted in block 1308.

In the block 1310, after the UE makes the determination that there is an overlapping portion between the PUSCH and PUCCH transmissions in the block 1306, the UE determines whether simultaneous transmission of PUCCH and PUSCH is supported. For example, situations where simultaneous transmission of PUCCH and PUSCH is supported include CP-OFDM configured for both the PUCCH and PUSCH, or DFT-S-OFDM with the same numerology configured for both the PUCCH and PUSCH. In one implementation, the UE may make the determination in the block 1310 by using the following three cases:

(1) The PUCCH and PUSCH are configured with different waveform/modulation methods (e.g., PUCCH using CP-OFDM and PUSCH using DFT-S-OFDM or vice versa).

(2) The PUCCH and PUSCH are configured with DFT-S-OFDM, but different numerologies are applied for the PUCCH and PUSCH transmissions.

(3) The UE does not support simultaneous PUCCH and PUSCH transmission, or simultaneous PUCCH and PUSCH is not configured for the UE.

If the UE determines that simultaneous PUCCH and PUSCH transmission is not supported, then the method 1300 proceeds to either the block 1312 or 1314. The UE determines whether the UCI is carried on the PUCCH or the PUSCH, and whether to transmit the PUCCH and/or PUSCH. In the block 1312, the UE is to transmit the UCI using the PUCCH in the overlapping portion between the PUCCH transmission and the PUSCH transmission, and drop (e.g., not transmit) PUSCH symbols in the overlapping portion of the PUSCH transmission. In the block 1314, the UE is to transmit the UCI using the PUSCH by multiplexing the UCI on the overlapping portion of the PUSCH transmission, and drop (e.g., not transmit) the PUCCH. The default behavior of selecting the block 1312 or 1314 may depend on the uplink control channel format.

In the block 1310, if the UE determines that simultaneous PUCCH and PUSCH transmission is supported, then the method 1300 proceeds to the block 1316.

In the block 1316, simultaneous PUCCH and PUSCH data transmission on the overlapping symbols is performed, and power allocation of overlapping symbols prioritizes the PUCCH transmission.

In the block 1318, if power is limited in the block 1316, the remaining power after PUCCH allocation may be allocated to the PUSCH REs in the symbol with power scaling if applicable.

In NR, at least two different types of uplink control channel (PUCCH) formats may be specified, at least one short PUCCH format and one long PUCCH format. The PUCCH channel is designed to carry uplink control information (UCI). Also, the physical uplink shared channel (PUSCH) will be defined to carry uplink data. The UCI may be reported on PUCCH or a PUSCH or both.

In NR, the PUCCH format and PUSCH format may be configured independently. The waveform type and numerologies for different channels may be the same or different. Thus, simultaneous transmission of PUCCH and PUSCH is restricted by many different conditions. Detailed methods on how to report UCI on which type of channel is under study and not defined yet. The present disclosure provides solutions and procedures for UCI reporting on different UL channels and formats.

In NR, several PUCCH formats will be specified. For UCI, different UCI may be reported on different PUCCH channel formats. Also, for NR, the PUSCH channel may also be very flexible, the size of a PUSCH may be a mini-slot, a slot, or span over multiple slots.

In NR, both cyclic prefix orthogonal frequency division multiplexing (CP-OFDM) and discrete Fourier transform spread OFDM (DFT-S-OFDM) waveforms are supported for UL transmission. Also, different numerologies may be used on one or more carriers or serving cells. The PUCCH and PUSCH transmissions from a UE may experience collision in some cases.

The UCI may be transmitted as L1/L2 control signaling, for example, via a PUCCH, PUSCH, or uplink data channel. Furthermore, the timing, between data reception and HARQ-ACK transmission as part of the downlink control information (DCI), may be dynamically indicate (at least in combination with radio resource control (RRC)).

In NR, different numerologies are supported on the same or different carriers. For the uplink transmission supports two waveform/modulation schemes based on Orthogonal Frequency Division Multiplexing (OFDM), such as Cyclic Prefix OFDM (CP-OFDM), Discrete Fourier Transform (DFT) Spread OFDM (DFT-S-OFDM), also known as Single Carrier FDMA (SC-FDMA), or low Peak-to-Average Power Ratio (PAPR) waveform.

Therefore, the uplink control and uplink data channel may be configured separately with the same or different waveforms and numerologies. The uplink control channel and uplink data channel collision and multiplexing should take into account all possible combinations.

FIG. 13B is a schematic diagram illustrating an exemplary implementation of a flow chart of a method, performed by the UE in FIG. 12, for reporting UCI. A method 1360 includes blocks 1362 and 1364. In block 1362, the method 1360 includes storing, by the UE, information on whether a simultaneous physical uplink control channel (PUCCH) and physical uplink shared channel (PUSCH) transmission is supported. In block 1364, the method 1360 further includes transmitting, by the UE, the UCI using the PUCCH in an overlapping portion between the PUCCH transmission and the PUSCH transmission, and dropping the overlapping portion of the PUSCH transmission, when the simultaneous PUCCH and PUSCH transmission is not supported and in case of a channel collision between a PUCCH transmission and a PUSCH transmission.

FIG. 13C is a schematic diagram illustrating an exemplary implementation of a flow chart of a method, performed by the gNB in FIG. 11, for receiving UCI from a UE. A method 1380 includes blocks 1382 and 1384. In block 1382, the method 1380 includes acquiring, by the gNB, information on whether a simultaneous physical uplink control channel (PUCCH) and physical uplink shared channel (PUSCH) transmission is supported by the UE. In block 1384, the method 1380 further includes receiving the UCI using the PUCCH transmission in an overlapping portion between the PUCCH transmission and the PUSCH transmission, and not receiving the overlapping portion of the PUSCH transmission, when the simultaneous PUCCH and PUSCH transmission is not supported and in case of a channel collision between a PUCCH transmission and a PUSCH transmission.

Figure 14A:
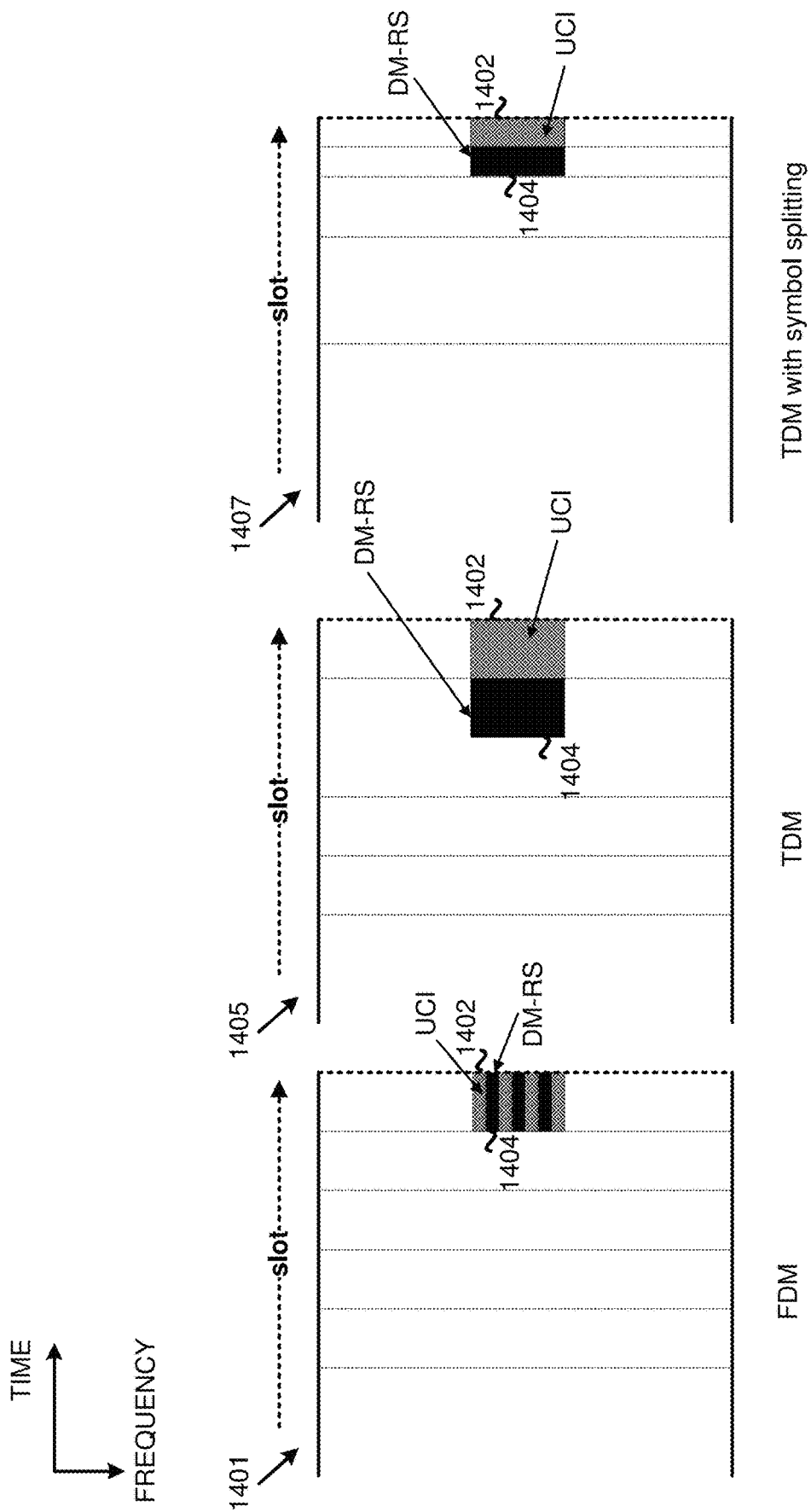
FIG. 14A is a schematic diagram illustrating an exemplary implementation of a NR short physical uplink control channel (PUCCH).

FIG. 14A illustrates examples of short PUCCH formats. In NR, at least two transmission durations are supported for uplink control, one short around the last OFDM symbol in a slot, TDMed or FDMed with data, and one long spanning multiple symbols (e.g., filling most of a slot or slots), FDMed with data. A short PUCCH is suitable for 1 or 2 bits of HARQ-ACK feedback and/or SR.

In one implementation, a short PUCCH format may occupy only one symbol. In this implementation, CP-OFDM modulation may be used. Reference symbols 1404 and UCI carrying symbols 1402 may be multiplexed in different subcarriers of a PUCCH resource, as shown in slot 1401 of FIG. 14A (i.e., FDM case).

In another implementation, a short PUCCH format may occupy two symbols. In this implementation, both CP-OFDM and DFT-S-OFDM modulations may be used. In case of DFT-S-OFDM, reference symbol 1404 and the UCI carrying symbol 1402 may be TDM multiplexed, as shown in slot 1405 of FIG. 14A (i.e., TDM case).

In yet another implementation, a short PUCCH may occupy one symbol of a reference numerology by splitting it into two symbols with a higher numerology, for example, by doubling the subcarrier spacing and reducing the symbol length by half, as shown in slot 1407 of FIG. 14A (i.e., TDM with symbol splitting case). In another example, a 2-symbol PUCCH may be used.

In yet another implementation, for TDM of a short PUCCH, in order to support TDM of short PUCCH from different UEs in the same slot, a mechanism to tell the UE in which symbol(s) in a slot to transmit the short PUCCH on is supported at 6 GHz or above.

A long PUCCH format may span multiple symbols and slots. Multiple long PUCCH formats may be defined, e.g., 4 symbols, a slot, and multiple slots, and etc. A long PUCCH format may be useful for larger payload HARQ-ACK feedback, CSI feedback, and etc.

At least a low PAPR/CM waveform should be supported for the long PUCCH format. A UCI carried by long duration UL control channel at least with low PAPR waveform may be transmitted in one slot or multiple slots, and transmission across multiple slots may allow a total duration of about 1 ms at least for some cases.

In terms of PUCCH format configuration, a combination of semi-static configuration and (at least for some types of UCI information) dynamic signaling is used to determine the PUCCH resource both for the long and short PUCCH formats.

In a LTE licensed band, a PUSCH may span over all symbols in a UL subframe. The last portion of a PUSCH may be punctured and replaced by a sounding reference signal (SRS) transmission. In LTE licenses assisted access (LAA), a PUSCH may not transmit in the first symbol and/or the last symbol of a UL LAA subframe. Furthermore, in the LTE shortened transmission time interval (sTTI) design, a UL sTTI may have a length of 2 symbols, 4 symbols or 7 symbols.

In NR, a PUSCH structure is more flexible as compared to that in LTE. For example, a PUSCH may be scheduled in mini-slot and slot levels. Furthermore, slot aggregation is supported. As such, a PUSCH can be scheduled across multiple slots. A mini-slot may be the minimum scheduling unit of a PUSCH transmission. The length of a mini-slot may be 2 symbols to the (slot length−1). The mini-slot length may support one symbol at least for bands over 6 GHz.

A PUSCH in NR may use the reference numerology of a serving cell. A PUSCH in NR may be scheduled using a different numerology from the reference numerology of the serving cell.

As in LTE, in NR, UCI on PUSCH is supported, for example, using portions of the scheduled resources for UCI in case of simultaneous UCI and data transmission.

For a UE, a long PUCCH format may use CP-OFDM modulation and DFT-S-OFDM modulation. A long PUCCH format may use the reference numerology of the serving cell, or a different numerology from the reference numerology of the serving cell.

In one implementation, the short PUCCH and long PUCCH formats may be configured for each UE. The short PUCCH format and the long PUCCH format may use the same modulation method (e.g., all CP-OFDM based). In another implementation, the short PUCCH format and the long PUCCH format may use different modulation methods (e.g., a short 1-symbol PUCCH using CP-OFDM, and a long multiple-symbol PUCCH using DFT-S-OFDM). Furthermore, the short PUCCH and long PUCCH may be configured with the same numerology or with different numerologies.

Different UEs may be configured with the same or different PUCCH formats. For a given UE, the PUSCH format may have the same waveform modulation as the PUCCH format. The PUSCH format may have a different waveform modulation from the PUCCH format. The PUSCH format may have the same numerology as the PUCCH format. The PUSCH format may have a different numerology from the PUCCH format. In addition, since NR supports different short or long PUCCH formats with different lengths, the length of a scheduled PUSCH transmission may be the same or different from the PUCCH format. Furthermore, a PUSCH resource may fully overlap or partially overlap with a PUCCH resource (e.g., symbols), for example, in time domain.

There are several different cases to be considered for the PUSCH and PUCCH multiplexing, depending on the waveform/modulation methods and other configurations. If the modulation method is CP-OFDM for both PUCCH and PUSCH, multiplexing of different channels is possible. Furthermore, applying different numerologies for PUSCH and PUSCH may also be possible in FDM.

If different waveform/modulation methods are used for PUCCH and PUSCH, multiplexing PUCCH and PUSCH channels is not possible regardless of whether the same or different numerologies are used. If DFT-S-OFDM is used for both PUCCH and PUSCH, but PUCCH and PUSCH are configured with different numerologies, multiplexing PUCCH and PUSCH channels is not possible. Table 1 lists the combinations of PUCCH and PUSCH and whether simultaneous PUCCH and PUSCH transmission is possible.

TABLE 1

| PUCCH Waveform | PUSCH Waveform | Numerology | Simultaneous PUCCH and PUSCH |
|---|---|---|---|
| CP-OFDM | DFT-S-OFDM | Any | Not possible |
| DFT-S-OFDM | CP-OFDM | Any | Not possible |
| DFT-S-OFDM | DFT-S-OFDM | Different numerologies for PUCCH and PUSCH | Not possible |
| DFT-S-OFDM | DFT-S-OFDM | Same numerology for PUCCH and PUSCH | Possible |
| CP-OFDM | CP-OFDM | Any | Possible |

If simultaneous PUCCH and PUSCH transmission is possible, there are several options:
(1) Simultaneous PUCCH and PUSCH transmission may have a default behavior.
(2) Whether or not to support simultaneous PUCCH and PUSCH transmission may be a UE capability.
(3) Whether or not to support simultaneous PUCCH and PUSCH transmission may be configured.

Since NR may support different short or long PUCCH formats with different lengths, the length of a scheduled PUSCH transmission may be the same or different from a PUCCH format. Also, a PUSCH resource may overlap or partial overlap with a PUCCH resource.

Furthermore, simultaneous transmission of a short PUCCH format and a long PUCCH format can be very different. A short PUCCH only occupies 1 or 2 symbols, while a long PUCCH format may span over multiple slots. Thus, the two PUCCH formats are discussed separately below.

Figure 14B:
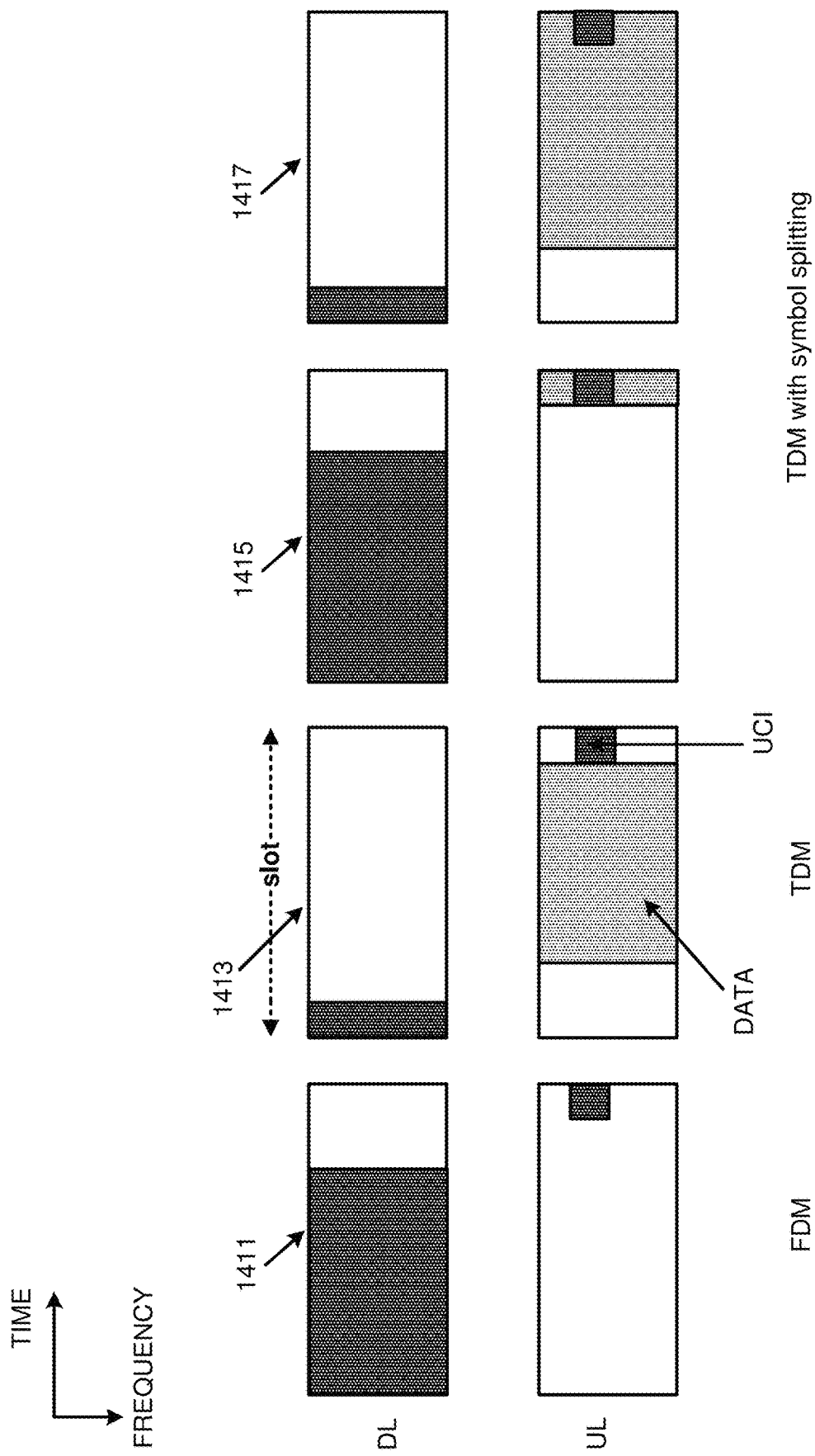
FIG. 14B is a schematic diagram illustrating an exemplary implementation of data and UCI multiplexing with short PUCCH formats.

FIG. 14B illustrates some examples of data and UCI multiplexing with short PUCCH shown in slots 1411, 1413, 1415, and 1417 for downlink (DL) and uplink (UL) transmissions. In case of a short uplink control format, it has been agreed that it can be multiplexed with data using FDM and/or TDM.

FDM of short UCI and data should be supported, both within a UE and between UEs at least for the case where the PRBs for short UCI and data are non-overlapping. Thus, if possible, FDM of data and UCI on short PUCCH should be supported, as least can be configurable. Thus, simultaneous short PUCCH and PUSCH transmission should be supported when possible.

In a DL centric slot, the last symbol may be reserved for HARQ-ACK feedback. Thus, UL data may not be allowed in the last symbol, and may not be scheduled for PUSCH transmission. On the other hand, if the last symbol is scheduled as a part of a UL data transmission, simultaneous PUCCH and PUSCH transmission may be supported.

Moreover, a short PUCCH in NR may be TDMed in different symbols for different UEs. Thus, the short PUCCH may not be limited to the last symbol(s) of a slot. The short PUCCH may use one or two symbols. Thus, a simple solution of prioritizing short PUCCH over PUSCH data may be sufficient. Several methods are considered for simultaneous PUCCH and PUSCH transmission.

Figure 15:
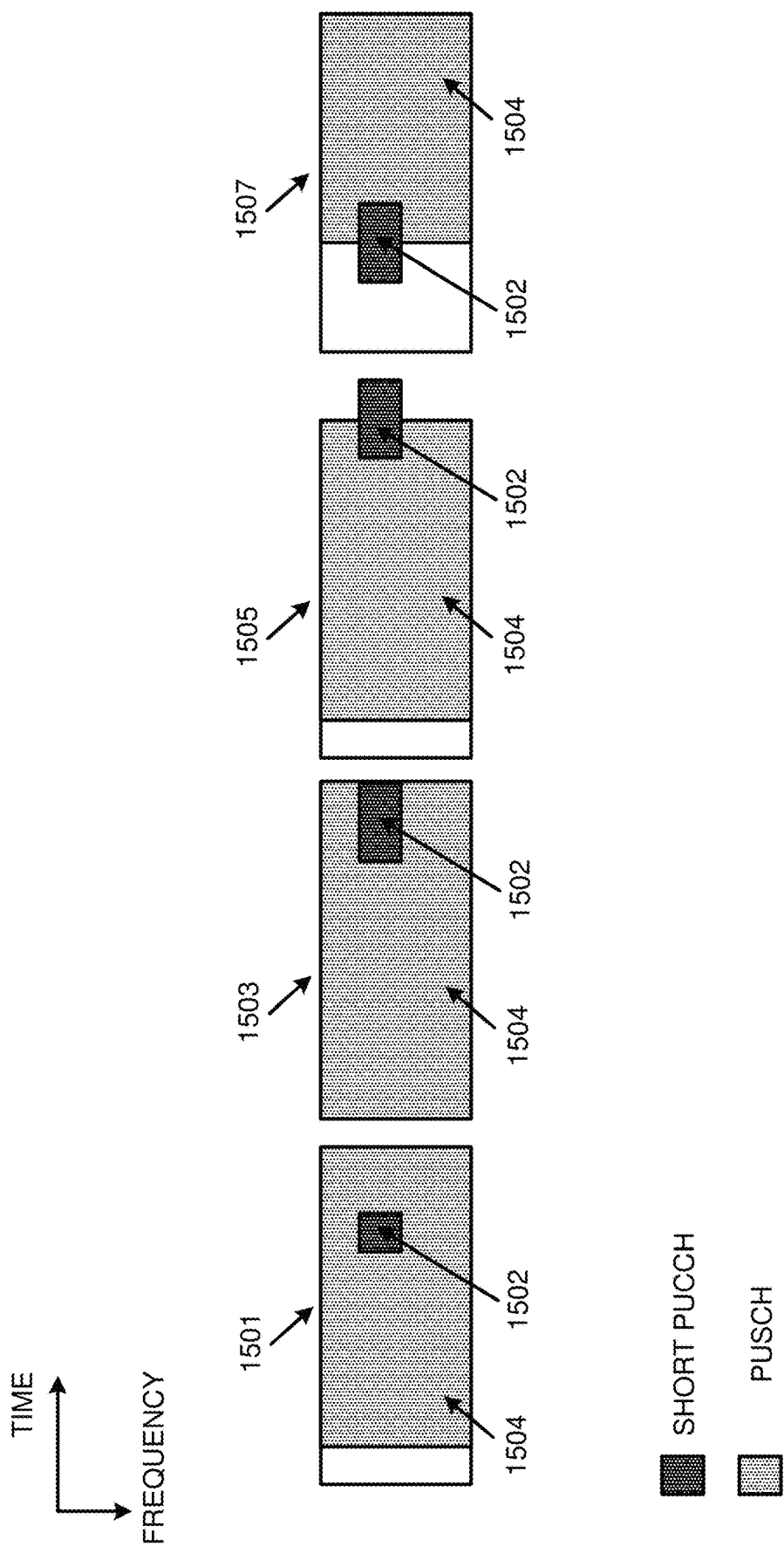
FIG. 15 is a schematic diagram illustrating various types of PUSCH and short PUCCH overlapping or collision.

FIG. 15 is a schematic diagram illustrating an exemplary implementation of types of PUSCH and short PUCCH overlapping or collision. An overlap or collision between a short PUCCH and a PUSCH occurs if there is any overlapping in time domain. In FIG. 15, several examples of a short PUCCH 1502 using one or two symbols are shown where the PUCCH and PUSCH may have overlapping resource elements (REs) in a frequency subcarrier. In other implementations, a PUCCH and PUSCH overlap or collision may occur even if the PUCCH and PUSCH use different frequency subcarriers. In the present implementation, the short PUCCH 1502 is prioritized over the PUSCH transmission 1504.

In FIG. 15, several overlapping/collision cases, as shown in examples 1501, 1503, 1505, and 1507, are considered for simultaneous PUCCH and PUSCH transmissions. The collision(s) may be a full overlap or a partial overlap in time domain between the PUCCH and PUSCH transmissions. For example, in the example 1501, an overlap or collision may occur, when the short PUCCH 1502 (e.g., a 1-symbol short PUCCH) overlaps with a scheduled PUSCH transmission 1504. For a short PUCCH 1502 (e.g., a 2-symbol short PUCCH), as shown in the examples 1503, 1505, and 1507, an overlap or collision may occur, when any symbol of a short PUCCH 1502 overlaps with a scheduled PUSCH transmission 1504. In the example 1503, a short PUCCH 1502 (e.g., a 2-symbol short PUCCH) fully overlaps with a scheduled PUSCH transmission 1504. In the example 1505, a short PUCCH 1502 (e.g., a 2-symbol short PUCCH) partially overlaps with an end portion of a scheduled PUSCH transmission 1504. In the example 1507, a short PUCCH 1502 (e.g., a 2-symbol short PUCCH) partially overlaps with a beginning portion of a scheduled PUSCH transmission 1504.

In a case, where the PUCCH and PUSCH transmissions do not overlap or collide, the PUCCH and PUSCH are transmitted according to their scheduling. However, when there is an overlap or collision between the PUCCH and PUSCH transmissions, the UE determines whether simultaneous transmission of PUCCH and PUSCH is supported. If simultaneous transmission of PUCCH and PUSCH is not supported, the UE determines which method to use to transmit the PUCCH and PUSCH.

In the following cases, simultaneous PUCCH and PUSCH transmission may not be supported.
  (1) The PUCCH and PUSCH are configured with different waveform/modulation methods (e.g., PUCCH using CP-OFDM and PUSCH using DFT-S-OFDM or vice versa).
  (2) The PUCCH and PUSCH are configured with DFT-S-OFDM, but different numerologies are applied for the PUCCH and PUSCH transmissions.
  (3) The UE does not support simultaneous PUCCH and PUSCH transmission, or simultaneous PUCCH and PUSCH is not configured for the UE.

Thus, simultaneous transmission of PUCCH and PUSCH may not be supported when the UE is not capable and/or configured for simultaneous PUCCH and PUSCH transmission. Moreover, simultaneous transmission of PUCCH and PUSCH may not be supported when the PUCCH and the PUSCH are configured with different waveforms, or the PUCCH and the PUSCH are configured with DFT-S-OFDM but have different numerologies.

When simultaneous transmission of PUCCH and PUSCH is not supported, there are several options: simultaneous PUCCH and PUSCH transmission may have a default behavior, whether or not to support simultaneous PUCCH and PUSCH transmission may be a UE's capability, and whether or not to support simultaneous PUCCH and PUSCH transmission may be configured. Since NR supports different short or long PUCCH formats with different lengths, the length of a scheduled PUSCH transmission may be the same or different from a PUCCH format. Also, a PUSCH may fully overlap or partially overlap with a PUCCH resource. Furthermore, simultaneous transmission of a short PUCCH format and a long PUCCH format can be very different. A short PUCCH only occupies 1 or 2 symbols, while a long PUCCH format may span over multiple slots.

Figure 16A:
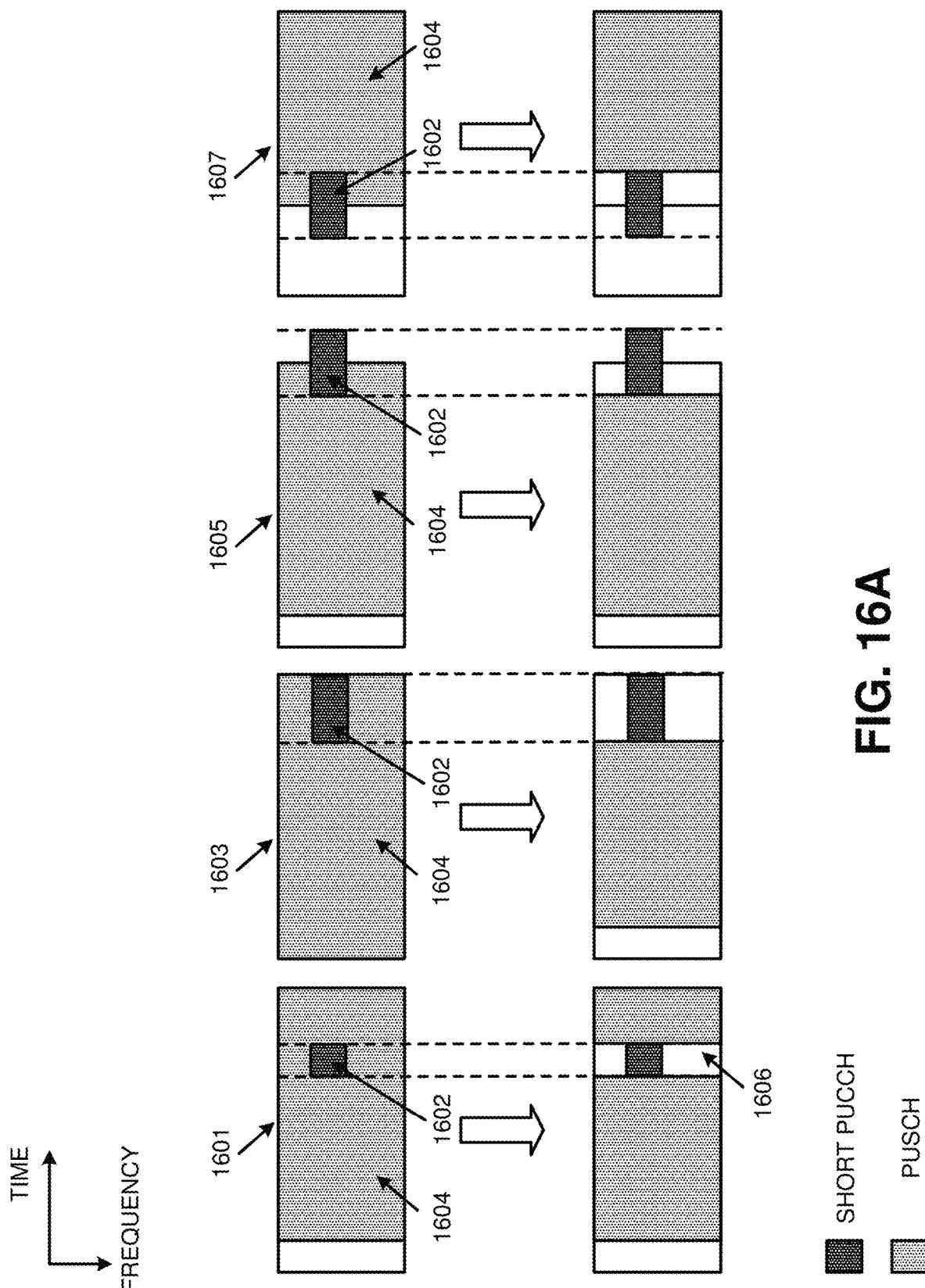
FIG. 16A is a schematic diagram illustrating exemplary implementations of prioritized short PUCCH transmission over PUSCH data.

FIG. 16A illustrates an exemplary implementation of a method of handling overlapping portions of a PUCCH and a PUSCH when simultaneous PUCCH and PUSCH transmission is not supported. As shown in FIG. 16A, examples 1601, 1603, 1605, and 1607 each illustrate a short PUCCH 1602 overlapping (e.g., fully or partially) with a PUSCH 1604. In the present exemplary method shown in FIG. 16A, the UE transmits the short PUCCH transmission 1604 and drops (not transmit) the overlapping portion of the PUSCH data 1606 of the PUSCH 1604.

As shown in FIG. 16A, in the example 1601, the short PUCCH 1602 (e.g., a 1-symbol short PUCCH) fully overlaps with a scheduled PUSCH 1604. In the example 1603, a short PUCCH 1602 (e.g., a 2-symbol short PUCCH) fully overlaps with a scheduled PUSCH 1604. In the example 1605, a short PUCCH 1602 (e.g., a 2-symbol short PUCCH) partially overlaps with an end portion of a scheduled PUSCH 1604. In the example 1607, a short PUCCH 1602 (e.g., a 2-symbol short PUCCH) partially overlaps with a beginning portion of a scheduled PUSCH 1604. In all of the examples 1601, 1603, 1605, and 1607, the UE transmits the short PUCCH 1602 and drops (not transmit) the overlapping portion of the PUSCH data 1606 of the PUSCH 1604. It is noted that the remaining portions of the PUSCH 1604 are still transmitted. That is, only the REs of the PUSCH data 1606 (e.g., symbol(s)) that overlaps or collides with the short PUCCH 1602 is dropped. For example, the PUSCH transmission may be stopped before the PUCCH transmission, and resumed after the PUCCH transmission.

In the present exemplary method shown in FIG. 16A, the PUCCH transmission may take priority over the PUSCH transmission regardless of whether the same or different waveforms and/or numerologies are applied for PUCCH and PUSCH. This method is particularly advantageous for a downlink centric slot where only UL symbols for short PUCCH is present in the slot.

The present exemplary method handles overlapping portions of a PUCCH and a PUSCH, when simultaneous PUCCH and PUSCH transmission is not supported, by transmitting the short PUCCH and dropping (not transmitting) the overlapping portion of the PUSCH data of the PUSCH transmission. In other words, when there is an overlap or collision between a short PUCCH transmission and a PUSCH transmission, the PUCCH transmission is prioritized over PUSCH data in the PUSCH transmission. Since a short PUCCH occupies one or two symbols, the number of REs available for PUSCH is limited on the PUCCH carrying symbols. Thus, dropping the PUSCH on a limited number of symbols may not have a significant impact on the PUSCH performance. The present exemplary method may be set as a default behavior for short PUCCH and PUSCH overlap/collision examples shown in FIG. 16A.

Similar to a short PUCCH transmission, a sounding reference signal (SRS) transmission only occupies one or two symbols. Thus, the same method described with reference to FIG. 16 may be used for an SRS transmission with a PUSCH transmission. Therefore, if an SRS transmission is scheduled with overlapping symbols of a PUSCH transmission, the overlapping PUSCH symbols may be dropped, and the SRS should be transmitted. It is noted that if a PUCCH collides with a scheduled SRS transmission, the SRS may be dropped. The transmission priority from the highest to the lowest, according to an implementation of the presentation is as follows: UCI on PUCCH, UCI on PUSCH, SRS, and PUSCH with data only.

Figure 16B:
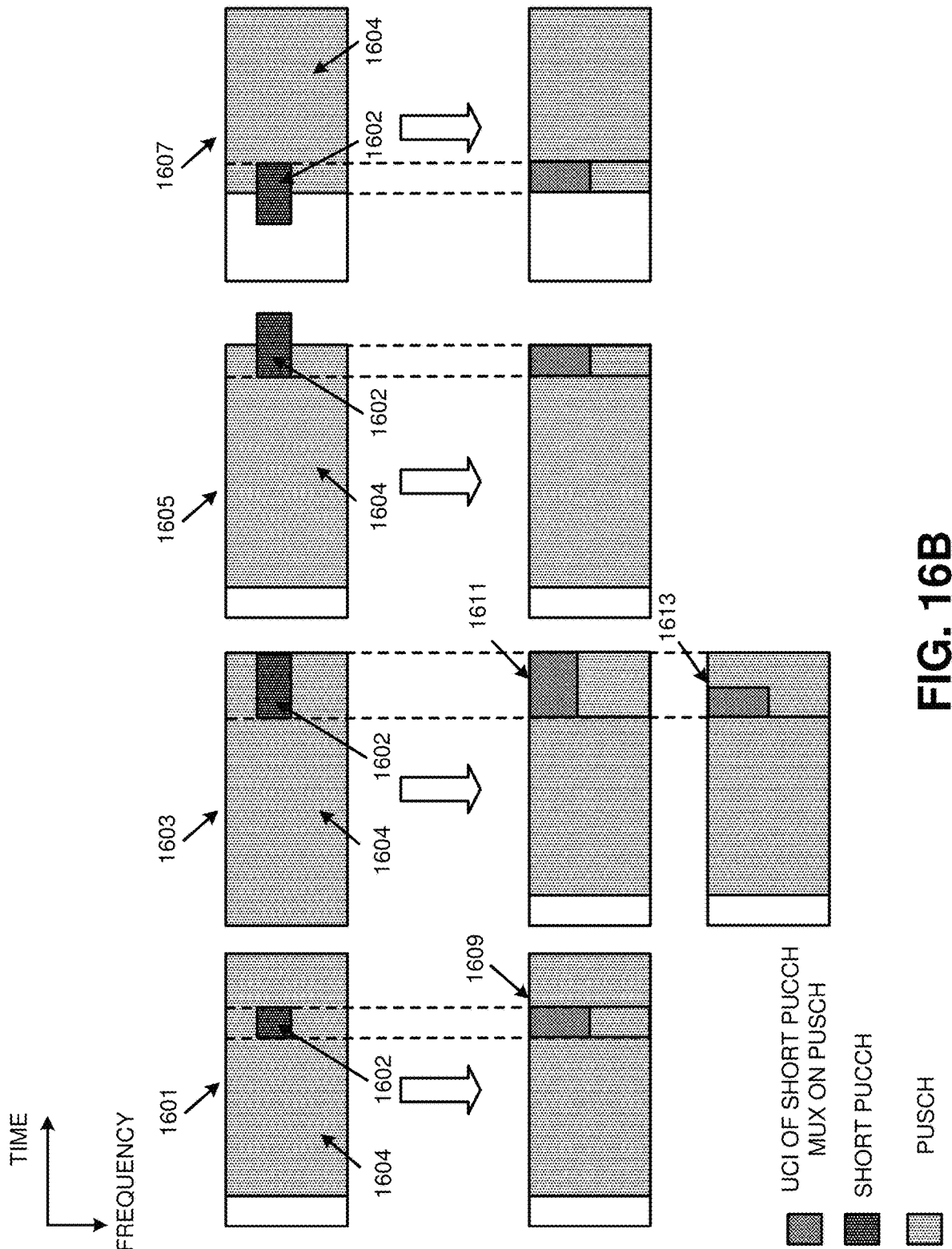
FIG. 16B is a schematic diagram illustrating exemplary implementations of UCI multiplexing on PUSCH in the overlapping portions of PUSCH and short PUCCH.

FIG. 16B illustrates an exemplary implementation of another method of handling overlapping portions of a short PUCCH and a PUSCH when simultaneous PUCCH and PUSCH transmission is not supported. As shown in FIG. 16B, examples 1601, 1603, 1605, and 1607 each illustrate a short PUCCH 1602 overlapping with a PUSCH 1604. In the present exemplary method shown in FIG. 16B, the UE drops the short PUCCH 1602 and multiplexes the UCI of the short PUCCH 1602 on the PUSCH 1604.

In the present exemplary method, the UCI is multiplexed on PUSCH data 1606 of the symbol(s) scheduled for the short PUCCH 1602 in an overlapping region 1609. As shown in the overlapping region 1609 of FIG. 16B, for the short PUCCH 1602 (e.g., a 1-symbol short PUCCH), the UCI is multiplexed on the PUSCH 1604. This ensures the UCI timing of PUCCH reporting is maintained even when the UCI is carried on the PUSCH 1604. To provide enough protection, a beta offset may be configured for control information multiplexing. The beta offset determines the coding rate redundancy of control information over data information. The coded bit after beta offset rate matching may be multiplexed on the PUSCH data symbols by replacing the existing PUSCH data symbols.

FIG. 16B shows several examples of a UCI multiplexing on a PUSCH in the overlapping symbols of a short PUCCH 1602 and a PUSCH 1604. In the examples 1601, 1605, and 1607, each UCI is multiplexed on the overlapping PUCCH 1602 and PUSCH 1604 symbol(s) (e.g., only 1 symbol in each case), as shown in the overlapping region 1609. The coded UCI bit loading may be performed in frequency domain of the PUSCH allocated resources (e.g., on REs in subcarriers with frequency high to low). In another example, if DFT-S-OFDM is used on the PUSCH, and the overlapping symbol is the DMRS symbol, the bit loading may be performed on the next symbol instead.

It should be noted that, in a case where the short PUCCH 1602 starts earlier than the PUSCH 1604, if the short PUCCH 1602 has already started before the PUSCH 1604, the method described with reference to FIG. 16A may be a better approach for transmitting the UCI, as multiplexing may not be suitable in such case.

In the example 1603 in FIG. 16B, two approaches may be considered for fully overlapping of a 2-symbol short PUCCH. In the first approach (i.e., approach 1613), the UCI may be multiplexed on all overlapping symbols, shown in the approach 1611, to provide time diversity gain. The coded UCI bit multiplexing may be performed first in time domain, and then in frequency domain of the PUSCH allocated resources (e.g., on REs in time domain from the earliest symbol first on subcarriers with frequencies from high to low). In the second approach (i.e., approach 1613), the UCI may be multiplexed to the earliest symbol of the overlapping region, which provides slightly faster UCI feedback than the multiplexing in the approach 1611. In approach 1613, the coded UCI bit multiplexing may be performed first in the frequency domain then in the time domain of the PUSCH allocated resources (e.g., on REs in the earliest symbol first on subcarriers with frequency from high to low).

For the two methods described with reference to FIGS. 16A and 16B, NR may determine a default behavior. The default behavior may include (1) transmitting the PUCCH and dropping the overlapping symbols on the PUSCH; (2) PUCCH UCI multiplexing on the PUSCH. In another implementation, the UE's behavior may be configured by a base station (e.g., gNB).

Figure 17:
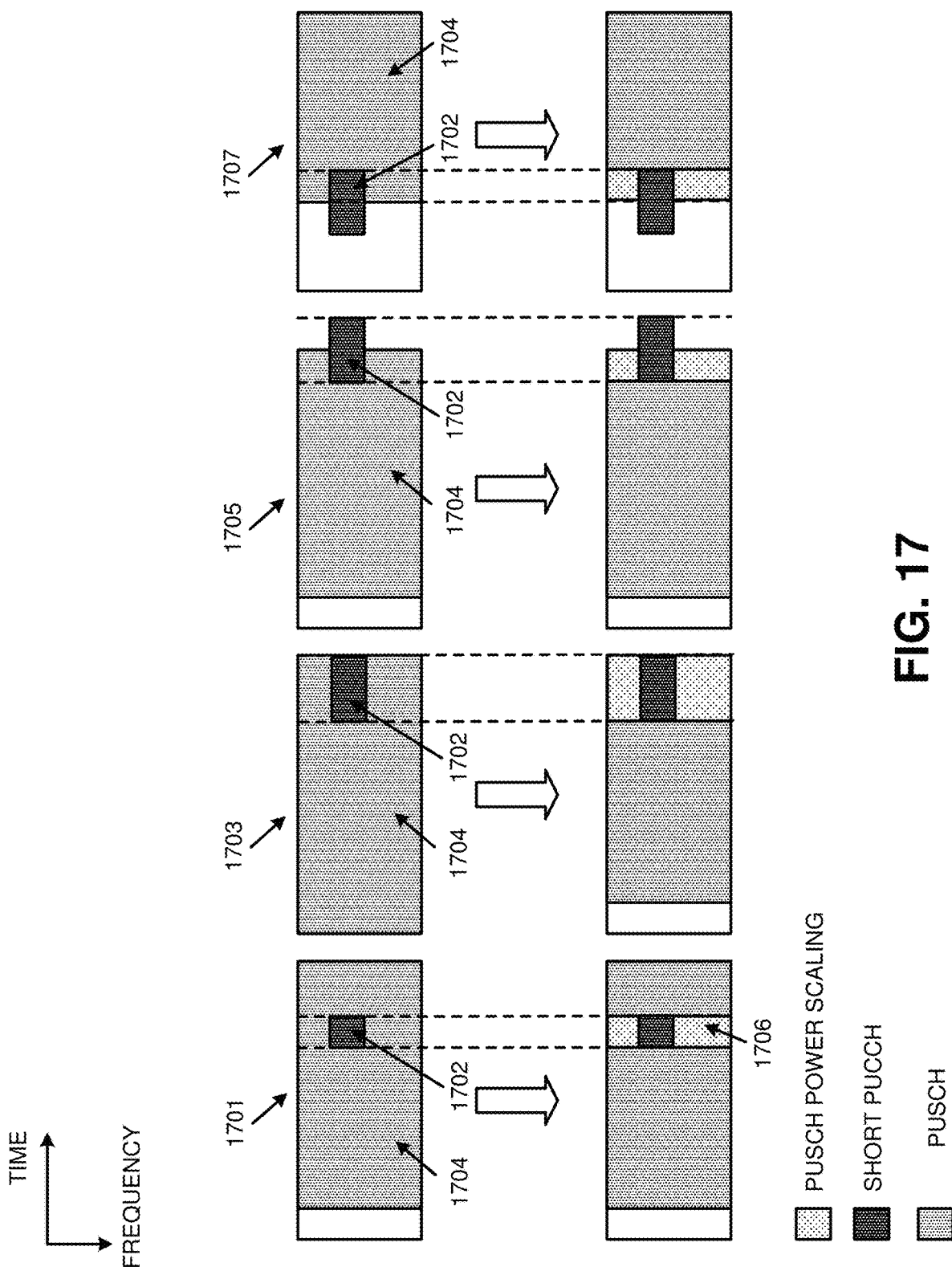
FIG. 17 is a schematic diagram illustrating an exemplary implementation of simultaneous PUCCH and PUSCH transmission with prioritized short PUCCH transmission and PUSCH power scaling.

FIG. 17 illustrates an exemplary implementation of a method of handling overlapping portions of a PUCCH and a PUSCH when simultaneous PUCCH and PUSCH transmission is supported. If a PUCCH region is defined/configured, the PUSCH may not overlap with the configured PUCCH region in frequency domain. Thus, there is no overlapping between PUCCH and PUSCH resource elements (REs) scheduled for a UE. Simultaneous PUCCH and PUSCH data transmission on the overlapping symbols may be performed in a FDM manner. On the other hand, if a PUCCH resource element overlaps with a scheduled PUSCH transmission, the PUCCH symbol(s) may be transmitted, and the PUSCH symbol(s) of the overlapped REs may be punctured, for example.

For CP-OFDM based transmissions, the overlapping PUSCH REs can be punctured. For DFT-S-OFDM based transmissions, puncturing overlapping PUSCH REs may be one option, which might cause minor issues during decoding on the receiver end (e.g., a gNB) due to, for example, break(s) in the DFT output. In another option, the puncturing may be performed at input complex number input before the DFT. The punctured input may then undergo DFT and bit loading to the corresponding REs with rate matching over the punctured symbols by the PUCCH transmission. For both options, the power allocation of overlapping symbols prioritizes the short PUCCH transmission.

As shown in examples 1701, 1703, 1705, and 1707 of FIG. 17, in the power limited case, the remaining powers after the PUCCH 1702 allocation can be allocated to the PUSCH REs 1706 in the symbol with power scaling when applicable.

Figure 18:
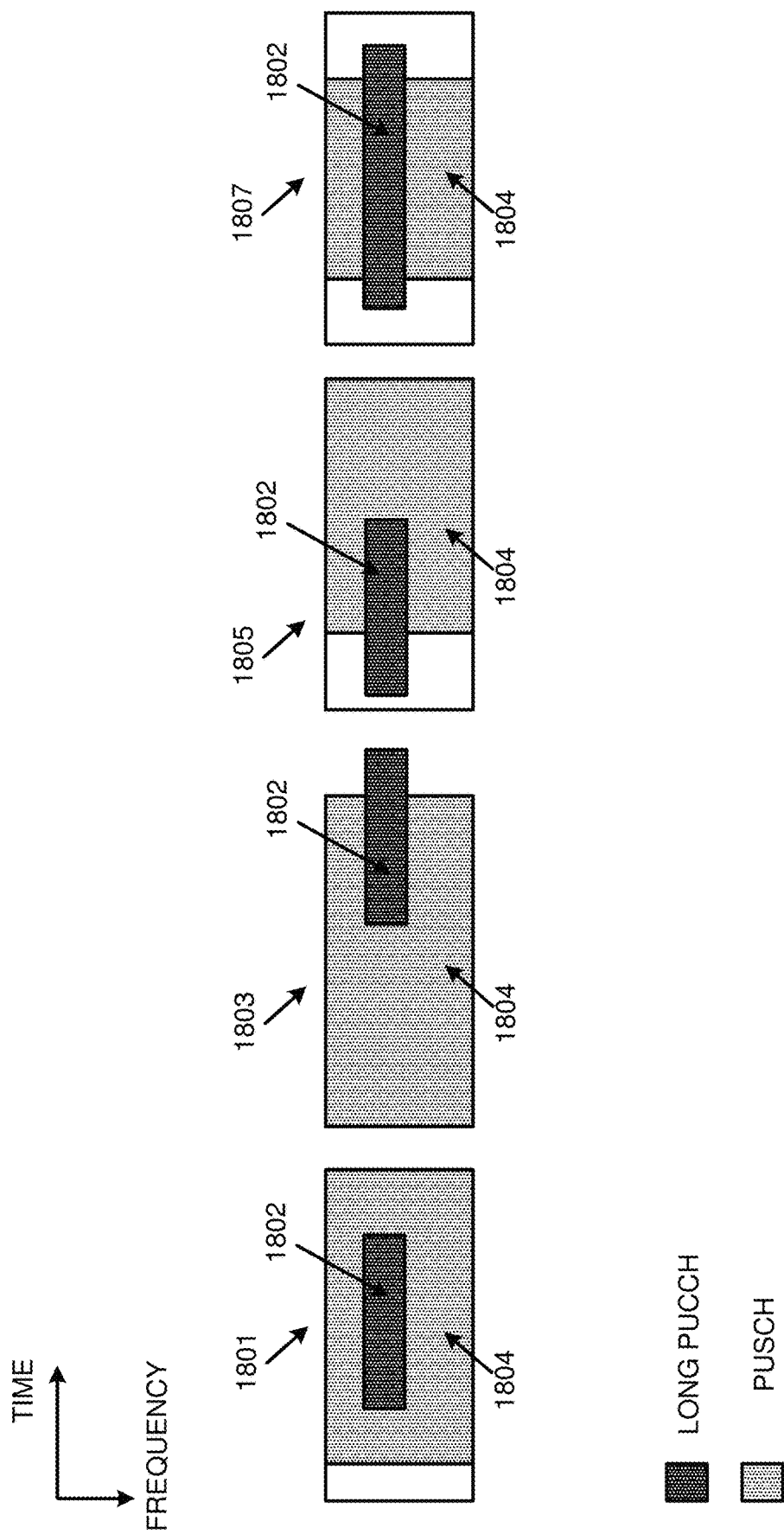
FIG. 18 is a schematic diagram illustrating an exemplary implementation of types of PUSCH and long PUCCH overlapping or collision.

FIG. 18 is a schematic diagram illustrating an exemplary implementation of types of PUSCH and long PUCCH overlapping or collision. In FIG. 18, examples 1801, 1803, 1805, and 1807 each show an overlapping or collision between a long PUCCH 1802 and a PUSCH 1804. The long PUCCH 1802 formats may span over multiple symbols or slots, and are more likely to schedule simultaneously with the PUSCH 1804. In case of simultaneous UCI and data, the UCI may use at least a portion of the scheduled data resources. Furthermore, since NR supports long PUCCH formats with different lengths, the length of a scheduled PUSCH transmission may be the same or different from the PUCCH format. Thus, a PUSCH may fully overlap or partial overlap with a PUCCH resource.

In FIG. 18, several overlapping/collision cases, as shown in examples 1801, 1803, 1805, and 1807, are considered for simultaneous PUCCH and PUSCH transmissions. The collision(s) may be a full overlap or a partial overlap in time domain between the PUCCH and PUSCH transmissions. For example, in the example 1801, a long PUCCH 1802 may fully overlap within a PUSCH 1804. In the examples 1803 and 1805, a long PUCCH 1802 may partially overlap within a PUSCH 1804. In the example 1807, a long PUCCH transmission 1802 format may be longer than a scheduled PUSCH 1804. Similar to collision with short PUCCH cases described above, the following cases can be considered for PUSCH collision with long PUCCH formats.

In a case, where PUCCH and PUSCH transmissions do not overlap or collide, the PUCCH and PUSCH are transmitted according to their scheduling. However, when there is an overlap or collision between the PUCCH and PUSCH transmissions, the UE determines whether simultaneous transmission of PUCCH and PUSCH is supported. If simultaneous transmission of PUCCH and PUSCH is not supported, the UE determines which method to use to transmit the PUCCH and PUSCH.

In the following cases, simultaneous PUCCH and PUSCH transmission may not be supported:
(1) PUCCH and PUSCH are configured with different waveform/modulation methods (e.g., PUCCH using CP-OFDM and PUSCH using DFT-S-OFDM or vice versa).
(2) PUCCH and PUSCH are configured with DFT-S-OFDM, but different numerologies are applied for PUCCH and PUSCH transmissions.
(3) The UE does not support simultaneous PUCCH and PUSCH transmission, or simultaneous PUCCH and PUSCH is not configured for a UE.

Figure 19A:
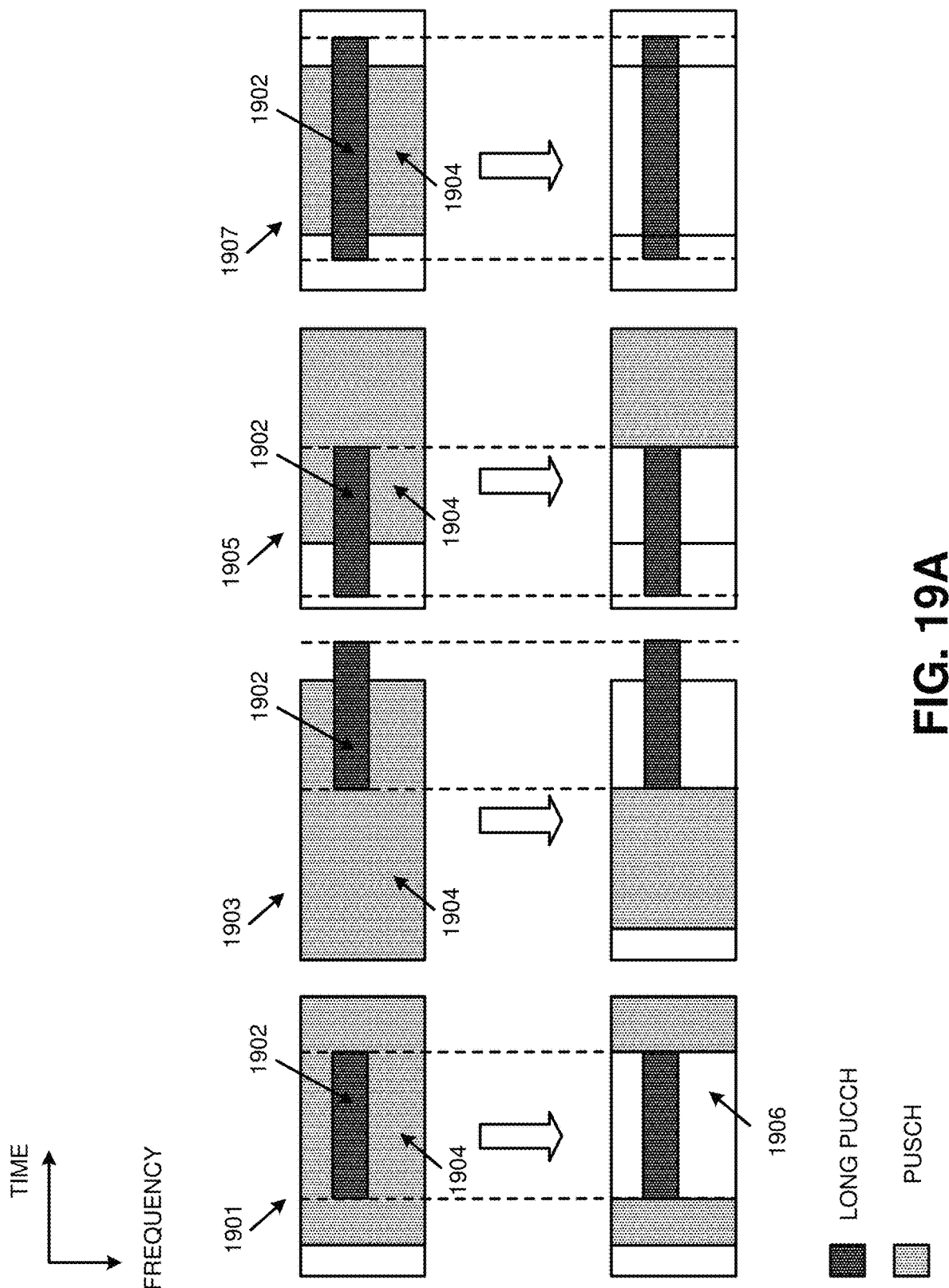
FIG. 19A is a schematic diagram illustrating an exemplary implementation of prioritized long PUCCH transmission over PUSCH data.

FIG. 19A illustrates an exemplary implementation of a method of handling overlapping portions of a PUCCH and a PUSCH when simultaneous PUCCH and PUSCH transmission is not supported. As shown in FIG. 19A, examples 1901, 1903, 1905, and 1907 each illustrate a long PUCCH 1902 transmission overlapping (e.g., fully or partially) with a PUSCH 1904. In the present exemplary method shown in FIG. 19A, the UE transmits the long PUCCH 1904 and drops (not transmit) the overlapping portion of the PUSCH data 1906 of the PUSCH 1904.

As shown in FIG. 19A, in the example 1901, a long PUCCH 1902 fully overlaps with a scheduled PUSCH 1904, where the long PUCCH 1902 is shorter than the PUSCH 1904. In the example 1903, a long PUCCH 1902 partially overlaps with an end portion of a scheduled PUSCH 1904. In the example 1905, a long PUCCH 1902 partially overlaps with a beginning portion of a scheduled PUSCH 1904. In the example 1907, a long PUCCH 1902 fully overlaps with a scheduled PUSCH 1904, where the long PUCCH 1902 is longer than the PUSCH 1904. It is noted that, in the example 1907, the entire PUSCH is dropped.

In all of the examples 1901, 1903, 1905, and 1907, the UE transmits the long PUCCH 1902 and drops (not transmit) the overlapping portion of the PUSCH data 1906 of the PUSCH 1904. It is noted that the remaining portions (if any) of the PUSCH 1904 are still transmitted. That is, only the REs of the PUSCH data 1906 (e.g., symbol(s)) that overlaps or collides with the long PUCCH 1902 is dropped. For example, the PUSCH transmission may be stopped before the PUCCH transmission, and resumed after the PUCCH transmission.

In the present exemplary method shown in FIG. 19A, the PUCCH transmission may take priority over the PUSCH transmission regardless of whether the same or different waveforms and/or numerologies are applied for PUCCH and PUSCH.

However, since the long PUCCH 1902 may span over multiple symbols, dropping all PUSCH REs of these symbols may have more impact on the PUSCH performance than the short PUCCH case. Thus, the present exemplary method shown in FIG. 19A may not be preferable for long PUCCH and PUSCH overlapping at least from some implementations, since dropping the entire or a major portion of the PUSCH may cause issues during decoding on the receiver end (e.g., a gNB).

Thus, the PUSCH dropping method as described with reference to FIG. 16a may be conditional. A threshold value can be used to determine whether the PUSCH should be partially transmitted or dropped entirely. The threshold can be a number of overlapping symbols or a percentage of overlapping symbols within the PUSCH transmission. If below the threshold, the PUSCH is partially transmitted by dropping the overlapping symbols with the PUCCH. If above the threshold, the PUSCH is dropped entirely. The threshold can be a default value or semi-statically configured by higher layer signaling.

Figure 19B:
FIG. 19B is a schematic diagram illustrating an exemplary implementation of UCI multiplexing on PUSCH in the overlapping portions of PUSCH and long PUCCH.

FIG. 19B illustrates an exemplary implementation of another method of handling overlapping portions of a long PUCCH and a PUSCH when simultaneous PUCCH and PUSCH transmission is not supported. As shown in FIG. 19B, examples 1901, 1903, 1905, and 1907 each illustrate a long PUCCH 1902 transmission overlapping with a PUSCH 1904. In present exemplary method shown in FIG. 19B, the UE drops the long PUCCH 1902 and multiplexes the UCI of the long PUCCH transmission 1902 on the PUSCH 1904. When simultaneous PUCCH and PUSCH transmission is not supported, the present exemplary method provides UCI multiplexing on the PUSCH, and may be a default behavior for long PUCCH and PUSCH overlapping.

In the present exemplary method, the UCI is multiplexed with the PUSCH 1904 on the overlapping symbol(s) scheduled for the long PUCCH 1902 in an overlapping region. This ensures the UCI timing of PUCCH reporting is maintained even when the UCI is carried on the PUSCH 1904. To provide enough protection, a beta offset may be configured for control information multiplexing. The beta offset determines the coding rate redundancy of control information over data information. The coded bit after beta offset rate matching should be multiplexed on the PUSCH data symbols by replacing existing PUSCH data symbols.

Since the multiplexing region includes multiple symbols, at least two approaches for multiplexing the UCI of long PUCCH 1902 to the PUSCH 1904 can be considered, as shown in example 1901, 1903, 1905 and 1907.

In the first exemplary approach (i.e., approach 1909), the UCI may be multiplexed on all overlapping symbols between the long PUCCH 1902 and PUSCH 1904, to provide time diversity gain, as shown in example 1901 of FIG. 19B. In the approach 1909, the coded UCI bit multiplexing may be performed first in time domain, and then in frequency domain of the PUSCH allocated resources (e.g., on REs in time domain from earliest symbol first on subcarriers with frequencies from high to low). It is noted that, in a special case of the approach 1909, not all symbols may be used for UCI multiplexing. That is, the UCI may be multiplexed on a subset of symbols in the overlapping region (e.g., on symbols adjacent or close to the demodulation symbols only), especially for the case of DFT-S-OFDM based transmission. While this approach may be more suitable for DFT-S-OFDM based transmissions, it may also be used for CP-OFDM based transmissions.

In the second exemplary approach (i.e., approach 1911), the UCI may be first multiplexed to the earliest symbols, which may provide a slight faster UCI feedback than the first exemplary approach. In this approach 1911, the coded UCI bit multiplexing may be performed first in frequency domain, and then in time domain of the PUSCH allocated resources (e.g., on REs in the earliest symbol first on subcarriers with frequencies from high to low). It is noted that, in a special case under the approach 1911, not all symbols may be used for UCI multiplexing. That is, the UCI may be multiplexed on a subset of symbols in the overlapping region (e.g., on symbols adjacent or close to the demodulation symbols only). While this approach may be more suitable for CP-OFDM based transmissions, it may also be used for DFT-S-OFDM based transmissions.

Furthermore, long PUCCH UCI multiplexing on PUSCH should consider two exceptional cases.

It should be noted that, in a case where the PUCCH transmission has already started before the PUSCH transmission, the method described with reference to FIG. 19A may be a better approach for transmitting the UCI, as multiplexing may not be suitable in such case. In another case, the overlapping region on a PUSCH is too small, and/or does not have the capacity to carry all of the UCI of a long PUCCH, the method described with reference to FIG. 19A may be a better approach for transmitting the UCI, as multiplexing may not be suitable in such case.

Thus, the multiplexing method as described with reference to FIG. 19B may be conditional. A threshold value can be used to determine whether the UCI should be multiplexed on PUSCH or transmitted on PUCCH. The threshold may be a number of REs required for UCI multiplexing on a given PUSCH. If the number of REs in the overlapping area is less than the number of REs required for UCI multiplexing on a given PUSCH, the UE may transmit the long PUCCH and drop the overlapping symbols on the PUSCH. Otherwise, the UCI is multiplexed on the PUSCH.

For the two methods described with reference to FIGS. 19A and 19B, NR may determine a default behavior. The default behavior may include (1) transmitting the PUCCH and dropping the overlapping symbols on the PUSCH; (2) PUCCH UCI multiplexing on the PUSCH. In another implementation, the UE's behavior may be configured by a base station (e.g., gNB).

Figure 20:
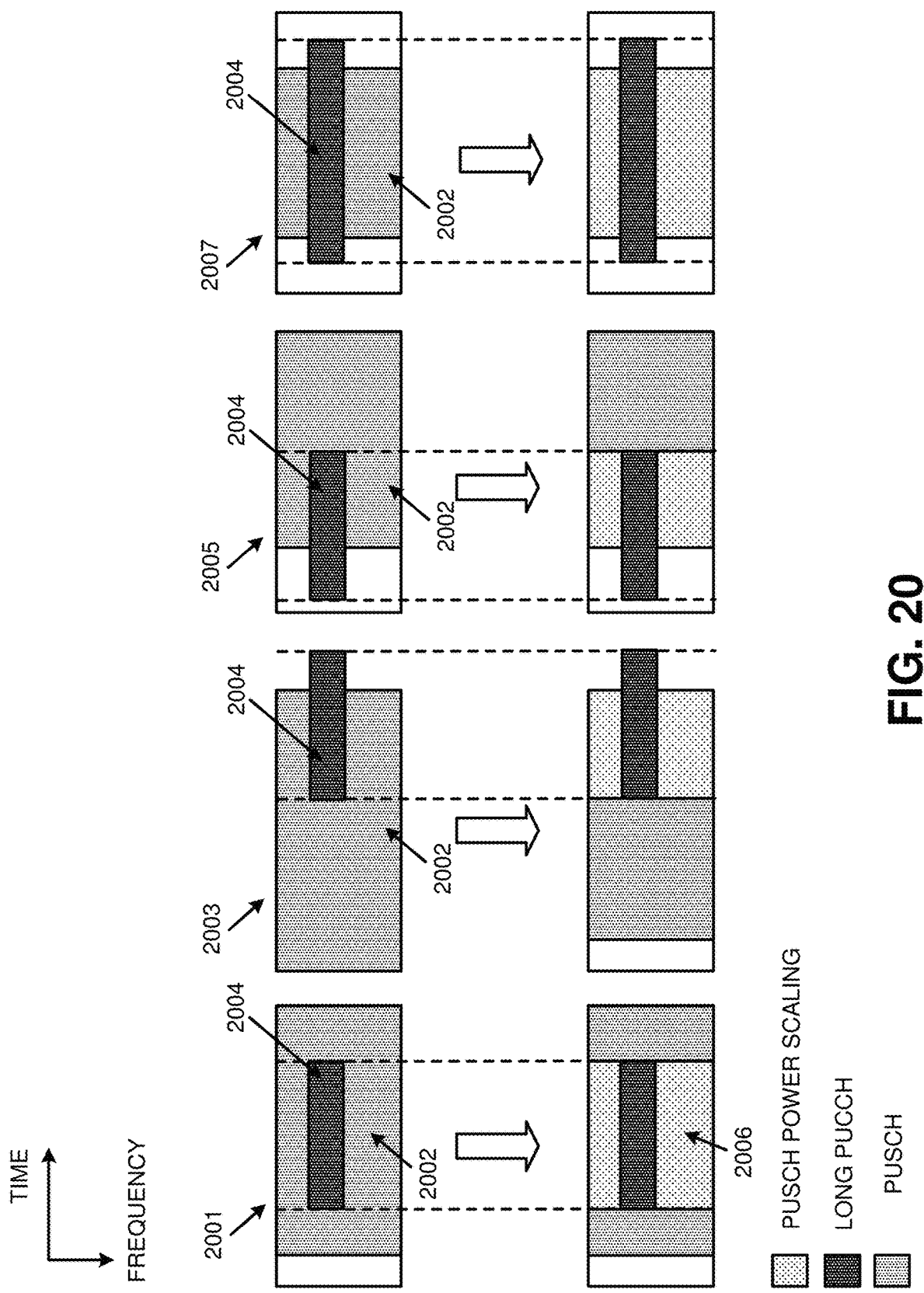
FIG. 20 is a schematic diagram illustrating an exemplary implementation of a simultaneous PUCCH and PUSCH transmission with prioritized long PUCCH transmission and PUSCH power scaling.

FIG. 20, illustrates an exemplary implementation of a method of handling overlapping portions of a PUCCH and a PUSCH when simultaneous PUCCH and PUSCH transmission is supported. If a PUCCH region is defined/configured, the PUSCH may multiplex with the configured PUCCH region. Thus, there is no overlapping between PUCCH and PUSCH REs scheduled for a UE. On the other hand, if PUCCH REs overlap with PUSCH REs, the PUCCH REs (e.g., symbols) may be transmitted, and the PUSCH REs (e.g., symbols) of the overlapped REs may be punctured.

For CP-OFDM based transmissions, the overlapping PUSCH REs can be punctured. For DFT-S-OFDM based transmissions, puncturing overlapping PUSCH REs may be one option, which might cause minor issues during decoding on the receiver end (e.g., a gNB) due to, for example, break(s) in the DFT output. In another option the puncturing may be performed at input complex number input before DFT. The punctured input may then undergo DFT and bit loading to the corresponding REs with rate matching over the punctured symbols by the PUCCH transmission. For both options, the power allocation of overlapping symbols prioritizes the short PUCCH transmission.

As shown in examples 2001, 2003, 2005, and 2007 of FIG. 20, in the power limited case, the remaining powers after the PUCCH 2002 allocation can be allocated to the PUSCH REs 2006 in the symbol with power scaling when applicable.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB (e.g., gNB 160 in FIG. 1) or the UE (e.g., UE 102 in FIG. 1) according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE (e.g., UE 102 in FIG. 1) according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) configured to report uplink control information (UCI), the UE comprising:
   a processor; and
   a non-transitory machine-readable memory storing instructions, executable by the processor, for:
      determining whether a channel collision between a physical uplink control channel (PUCCH) and a physical uplink shared channel (PUSCH) has occurred by determining whether overlapping symbols between the PUCCH and the PUSCH within a slot exists; and
      after determining that the channel collision between the PUCCH and the PUSCH within the slot has occurred,
         transmitting the UCI using the PUCCH,
         dropping the overlapping symbols of the PUSCH in the slot, and
         transmitting the PUSCH in non-overlapping symbols in the slot;
   wherein the non-transitory machine-readable memory further stores instructions for determining that a simultaneous transmission of the PUCCH and the PUSCH is not supported before determining whether the channel collision between the PUCCH and the PUSCH has occurred.

2. The UE of claim 1, wherein the instructions for determining whether the simultaneous transmission of the PUCCH and the PUSCH is not supported comprise instructions for determining whether the simultaneous transmission of the PUCCH and the PUSCH is not supported based on at least one of subcarrier spacing and waveforms in the PUCCH and the PUSCH.

3. A base station configured to acquire uplink control information (UCI) from a user equipment (UE), the base station comprising:
   a processor; and
   a non-transitory machine-readable memory storing instructions, executable by the processor, for:
      receiving, from the UE, the UCI via a physical uplink control channel (PUCCH) when overlapping symbols between the PUCCH and a physical uplink shared channel (PUSCH) within a slot exists; and
      receiving the PUSCH in non-overlapping symbols in the slot, wherein the UE drops the overlapping symbols of the PUSCH in the slot;
   wherein the non-transitory machine-readable memory further stores instructions for determining that a simultaneous transmission of the PUCCH and the PUSCH is not supported before determining whether the channel collision between the PUCCH and the PUSCH has occurred.

4. The base station of claim 3, wherein the instructions for determining whether the simultaneous transmission of the PUCCH and the PUSCH is not supported comprise instructions for determining whether the simultaneous transmission of the PUCCH and the PUSCH is not supported based on at least one of subcarrier spacing and waveforms in the PUCCH and the PUSCH.

* * * * *